United States Patent
Cole et al.

(10) Patent No.: US 8,845,878 B2
(45) Date of Patent: Sep. 30, 2014

(54) REDUCING CARBON DIOXIDE TO PRODUCTS

(71) Applicant: Liquid Light, Inc., Monmouth Junction, NJ (US)

(72) Inventors: Emily Barton Cole, Houston, TX (US); Narayanappa Sivasankar, Plainsboro, NJ (US); Rishi Parajuli, Kendell Park, NJ (US); Kate A. Keets, Lawrenceville, NJ (US)

(73) Assignee: Liquid Light, Inc., Monmouth Junction, NJ (US)

( * ) Notice: Subject to any disclaimer, the term of this patent is extended or adjusted under 35 U.S.C. 154(b) by 0 days.

(21) Appl. No.: 13/787,304

(22) Filed: Mar. 6, 2013

(65) Prior Publication Data
US 2013/0199937 A1    Aug. 8, 2013

Related U.S. Application Data

(63) Continuation-in-part of application No. 12/846,221, filed on Jul. 29, 2010.

(60) Provisional application No. 61/609,088, filed on Mar. 9, 2012, provisional application No. 61/607,240, filed on Mar. 6, 2012.

(51) Int. Cl.
  C25B 1/00      (2006.01)
  C25B 3/04      (2006.01)

(52) U.S. Cl.
  CPC ... *C25B 1/00* (2013.01); *C25B 3/04* (2013.01); *C25B 1/003* (2013.01)
  USPC ..................................................... 205/555

(58) Field of Classification Search
  None
  See application file for complete search history.

(56) References Cited

U.S. PATENT DOCUMENTS 1,280,622 A    10/1918   Andrews
3,019,256 A     1/1962   Dunn
(Continued)

FOREIGN PATENT DOCUMENTS

AU    2012202601 A1    5/2012
CA       2604569 A1   10/2006
(Continued)

OTHER PUBLICATIONS

Seshadri et al, "A new homogeneous catalyst for the reduction of carbon dioxide to methanol at low overpotential," Journal of Electroanalytical Chemistry, 372 (1994) 145-150.*

(Continued)

*Primary Examiner* — Keith Hendricks
*Assistant Examiner* — Salil Jain
(74) *Attorney, Agent, or Firm* — Suiter Swantz pc llo

(57) ABSTRACT

A method reducing carbon dioxide to one or more products may include steps (A) to (C). Step (A) may bubble said carbon dioxide into a solution of an electrolyte and a catalyst in a divided electrochemical cell. The divided electrochemical cell may include an anode in a first cell compartment and a cathode in a second cell compartment. The cathode may reduce said carbon dioxide into said products. Step (B) may adjust one or more of (a) a cathode material, (b) a surface morphology of said cathode, (c) said electrolyte, (d) a manner in which said carbon dioxide is bubbled, (e), a pH level of said solution, and (f) an electrical potential of said divided electrochemical cell, to vary at least one of (i) which of said products is produced and (ii) a faradaic yield of said products. Step (C) may separate said products from said solution.

15 Claims, 10 Drawing Sheets

(56) References Cited

U.S. PATENT DOCUMENTS

| | | | |
|---|---|---|---|
| 3,399,966 | A | 9/1968 | Suzuki et al. |
| 3,401,100 | A | 9/1968 | Macklin |
| 3,560,354 | A | 2/1971 | Young |
| 3,607,962 | A | 9/1971 | Krekeler et al. |
| 3,636,159 | A | 1/1972 | Solomon |
| 3,720,591 | A | 3/1973 | Skarlos |
| 3,745,180 | A | 7/1973 | Rennie |
| 3,764,492 | A | 10/1973 | Baizer et al. |
| 3,779,875 | A | 12/1973 | Michelet |
| 3,894,059 | A | 7/1975 | Selvaratnam |
| 3,899,401 | A | 8/1975 | Nohee et al. |
| 3,959,094 | A | 5/1976 | Steinberg |
| 4,072,583 | A | 2/1978 | Hallcher et al. |
| 4,088,682 | A | 5/1978 | Jordan |
| 4,147,599 | A | 4/1979 | O'Leary et al. |
| 4,160,816 | A | 7/1979 | Williams et al. |
| 4,219,392 | A | 8/1980 | Halmann |
| 4,253,921 | A | 3/1981 | Baldwin et al. |
| 4,299,981 | A | 11/1981 | Leonard |
| 4,343,690 | A | 8/1982 | De Nora |
| 4,381,978 | A | 5/1983 | Gratzel et al. |
| 4,414,080 | A | 11/1983 | Williams et al. |
| 4,421,613 | A | 12/1983 | Goodridge et al. |
| 4,439,302 | A | 3/1984 | Wrighton et al. |
| 4,450,055 | A | 5/1984 | Stafford |
| 4,451,342 | A | 5/1984 | Lichtin et al. |
| 4,460,443 | A | 7/1984 | Somorjai et al. |
| 4,474,652 | A | 10/1984 | Brown et al. |
| 4,476,003 | A | 10/1984 | Frank et al. |
| 4,478,694 | A | 10/1984 | Weinberg |
| 4,478,699 | A | 10/1984 | Halmann et al. |
| 4,510,214 | A | 4/1985 | Crouse et al. |
| 4,545,886 | A | 10/1985 | De Nora et al. |
| 4,560,451 | A | 12/1985 | Nielsen |
| 4,595,465 | A | 6/1986 | Ang et al. |
| 4,608,132 | A | 8/1986 | Sammells |
| 4,608,133 | A | 8/1986 | Morduchowitz et al. |
| 4,609,440 | A | 9/1986 | Frese, Jr. et al. |
| 4,609,441 | A | 9/1986 | Frese, Jr. et al. |
| 4,609,451 | A | 9/1986 | Sammells et al. |
| 4,619,743 | A | 10/1986 | Cook |
| 4,620,906 | A | 11/1986 | Ang |
| 4,661,422 | A | 4/1987 | Marianowski et al. |
| 4,668,349 | A | 5/1987 | Cuellar et al. |
| 4,673,473 | A | 6/1987 | Ang et al. |
| 4,702,973 | A | 10/1987 | Marianowski |
| 4,732,655 | A | 3/1988 | Morduchowitz et al. |
| 4,756,807 | A | 7/1988 | Meyer et al. |
| 4,776,171 | A | 10/1988 | Perry, Jr. et al. |
| 4,793,904 | A | 12/1988 | Mazanec et al. |
| 4,824,532 | A | 4/1989 | Moingeon et al. |
| 4,845,252 | A | 7/1989 | Schmidt et al. |
| 4,855,496 | A | 8/1989 | Anderson et al. |
| 4,897,167 | A | 1/1990 | Cook et al. |
| 4,902,828 | A | 2/1990 | Wickenhaeuser et al. |
| 4,921,586 | A | 5/1990 | Molter |
| 4,936,966 | A | 6/1990 | Garnier et al. |
| 4,945,397 | A | 7/1990 | Schuetz |
| 4,959,131 | A | 9/1990 | Cook et al. |
| 5,064,733 | A | 11/1991 | Krist et al. |
| 5,198,086 | A | 3/1993 | Chlanda et al. |
| 5,246,551 | A | 9/1993 | Pletcher et al. |
| 5,284,563 | A | 2/1994 | Fujihira et al. |
| 5,290,404 | A | 3/1994 | Toomey et al. |
| 5,294,319 | A | 3/1994 | Kaczur et al. |
| 5,300,369 | A | 4/1994 | Dietrich et al. |
| 5,382,332 | A | 1/1995 | Fujihira et al. |
| 5,443,804 | A * | 8/1995 | Parker et al. ............. 423/230 |
| 5,474,658 | A | 12/1995 | Scharbert et al. |
| 5,514,492 | A | 5/1996 | Marincic et al. |
| 5,536,856 | A | 7/1996 | Harrison et al. |
| 5,587,083 | A | 12/1996 | Twardowski |
| 5,763,662 | A | 6/1998 | Ikariya et al. |
| 5,804,045 | A | 9/1998 | Orillon et al. |
| 5,858,240 | A | 1/1999 | Twardowski et al. |
| 5,928,806 | A | 7/1999 | Olah et al. |
| 6,001,500 | A | 12/1999 | Bass et al. |
| 6,024,935 | A * | 2/2000 | Mills et al. ............. 423/648.1 |
| 6,137,005 | A | 10/2000 | Honevik |
| 6,171,551 | B1 | 1/2001 | Malchesky et al. |
| 6,187,465 | B1 | 2/2001 | Galloway |
| 6,251,256 | B1 | 6/2001 | Blay et al. |
| 6,270,649 | B1 | 8/2001 | Zeikus et al. |
| 6,312,655 | B1 | 11/2001 | Hesse et al. |
| 6,348,613 | B2 | 2/2002 | Miyamoto et al. |
| 6,409,893 | B1 | 6/2002 | Holzbock et al. |
| 6,492,047 | B1 | 12/2002 | Peled et al. |
| 6,657,119 | B2 | 12/2003 | Lindquist et al. |
| 6,755,947 | B2 | 6/2004 | Schulze et al. |
| 6,777,571 | B2 | 8/2004 | Chaturvedi et al. |
| 6,806,296 | B2 | 10/2004 | Shiroto et al. |
| 6,881,320 | B1 | 4/2005 | Krafton et al. |
| 6,887,728 | B2 | 5/2005 | Miller et al. |
| 6,906,222 | B2 | 6/2005 | Slany et al. |
| 6,936,143 | B1 | 8/2005 | Graetzel et al. |
| 6,942,767 | B1 | 9/2005 | Fazzina et al. |
| 6,949,178 | B2 | 9/2005 | Tennakoon et al. |
| 7,037,414 | B2 | 5/2006 | Fan |
| 7,052,587 | B2 | 5/2006 | Gibson et al. |
| 7,094,329 | B2 | 8/2006 | Saha et al. |
| 7,314,544 | B2 | 1/2008 | Murphy et al. |
| 7,318,885 | B2 | 1/2008 | Omasa |
| 7,338,590 | B1 | 3/2008 | Shelnutt et al. |
| 7,361,256 | B2 | 4/2008 | Henry et al. |
| 7,378,561 | B2 | 5/2008 | Olah et al. |
| 7,704,369 | B2 | 4/2010 | Olah et al. |
| 7,883,610 | B2 | 2/2011 | Monzyk et al. |
| 8,227,127 | B2 | 7/2012 | Little et al. |
| 8,313,634 | B2 | 11/2012 | Bocarsly et al. |
| 8,444,844 | B1 | 5/2013 | Teamey et al. |
| 8,562,811 | B2 | 10/2013 | Sivasankar et al. |
| 2001/0026884 | A1 | 10/2001 | Appleby et al. |
| 2003/0029733 | A1 | 2/2003 | Otsuka et al. |
| 2004/0089540 | A1 | 5/2004 | Van Heuveln et al. |
| 2005/0011755 | A1 | 1/2005 | Jovic et al. |
| 2005/0011765 | A1 | 1/2005 | Omasa |
| 2005/0051439 | A1 | 3/2005 | Jang |
| 2005/0139486 | A1 | 6/2005 | Carson et al. |
| 2006/0102468 | A1 | 5/2006 | Monzyk et al. |
| 2006/0235091 | A1 | 10/2006 | Olah et al. |
| 2006/0243587 | A1 | 11/2006 | Tulloch et al. |
| 2007/0004023 | A1 | 1/2007 | Trachtenberg et al. |
| 2007/0012577 | A1 | 1/2007 | Bulan et al. |
| 2007/0045125 | A1 | 3/2007 | Hartvigsen et al. |
| 2007/0054170 | A1 | 3/2007 | Isenberg |
| 2007/0122705 | A1 | 5/2007 | Paulsen et al. |
| 2007/0184309 | A1 | 8/2007 | Gust, Jr et al. |
| 2007/0224479 | A1 | 9/2007 | Tadokoro et al. |
| 2007/0231619 | A1 | 10/2007 | Strobel et al. |
| 2007/0240978 | A1 | 10/2007 | Beckmann et al. |
| 2007/0254969 | A1 | 11/2007 | Olah et al. |
| 2007/0282021 | A1 | 12/2007 | Campbell |
| 2008/0011604 | A1 | 1/2008 | Stevens et al. |
| 2008/0039538 | A1 | 2/2008 | Olah et al. |
| 2008/0060947 | A1 | 3/2008 | Kitsuka et al. |
| 2008/0072496 | A1 | 3/2008 | Yogev et al. |
| 2008/0090132 | A1 | 4/2008 | Ivanov et al. |
| 2008/0116080 | A1 | 5/2008 | Lal et al. |
| 2008/0145721 | A1 | 6/2008 | Shapiro et al. |
| 2008/0223727 | A1 | 9/2008 | Oloman et al. |
| 2008/0248350 | A1 | 10/2008 | Little et al. |
| 2008/0283411 | A1 | 11/2008 | Eastman et al. |
| 2008/0286643 | A1 * | 11/2008 | Iwasaki ............. 429/111 |
| 2008/0287555 | A1 | 11/2008 | Hussain et al. |
| 2008/0296146 | A1 | 12/2008 | Toulhoat et al. |
| 2009/0014336 | A1 * | 1/2009 | Olah et al. ............. 205/450 |
| 2009/0030240 | A1 | 1/2009 | Olah et al. |
| 2009/0038955 | A1 | 2/2009 | Rau |
| 2009/0057161 | A1 | 3/2009 | Aulich et al. |
| 2009/0061267 | A1 | 3/2009 | Monzyk et al. |
| 2009/0062110 | A1 | 3/2009 | Koshino et al. |
| 2009/0069452 | A1 | 3/2009 | Robota |
| 2009/0134007 | A1 | 5/2009 | Solis Herrera |
| 2009/0277799 | A1 | 11/2009 | Grimes et al. |

(56) References Cited

U.S. PATENT DOCUMENTS

| | | |
|---|---|---|
| 2009/0308759 A1 | 12/2009 | Waycuilis |
| 2010/0069600 A1 | 3/2010 | Morelle et al. |
| 2010/0084280 A1 | 4/2010 | Gilliam et al. |
| 2010/0147699 A1 | 6/2010 | Wachsman et al. |
| 2010/0150802 A1 | 6/2010 | Gilliam et al. |
| 2010/0180889 A1 | 7/2010 | Monzyk et al. |
| 2010/0187123 A1 | 7/2010 | Bocarsly et al. |
| 2010/0187125 A1 | 7/2010 | Sandoval et al. |
| 2010/0191010 A1 | 7/2010 | Bosman et al. |
| 2010/0193370 A1 | 8/2010 | Olah et al. |
| 2010/0196800 A1 | 8/2010 | Markoski et al. |
| 2010/0213046 A1 | 8/2010 | Grimes et al. |
| 2010/0248042 A1 | 9/2010 | Nakagawa et al. |
| 2010/0282614 A1 | 11/2010 | Detournay et al. |
| 2010/0305629 A1 | 12/2010 | Lund et al. |
| 2010/0307912 A1 | 12/2010 | Zommer |
| 2011/0014100 A1 | 1/2011 | Bara et al. |
| 2011/0024288 A1 | 2/2011 | Bhavaraju et al. |
| 2011/0083968 A1 | 4/2011 | Gilliam et al. |
| 2011/0114501 A1 | 5/2011 | Teamey et al. |
| 2011/0114502 A1 | 5/2011 | Cole et al. |
| 2011/0114503 A1 | 5/2011 | Sivasankar et al. |
| 2011/0114504 A1 | 5/2011 | Sivasankar et al. |
| 2011/0143929 A1 | 6/2011 | Sato et al. |
| 2011/0186441 A1 | 8/2011 | LaFrancois et al. |
| 2011/0226632 A1 | 9/2011 | Cole et al. |
| 2011/0237830 A1 | 9/2011 | Masel |
| 2011/0318617 A1 | 12/2011 | Kirchev et al. |
| 2012/0018311 A1* | 1/2012 | Yotsuhashi et al. ........... 205/555 |
| 2012/0043301 A1 | 2/2012 | Arvin et al. |
| 2012/0132538 A1 | 5/2012 | Cole et al. |
| 2012/0199493 A1 | 8/2012 | Krafft et al. |
| 2012/0215034 A1 | 8/2012 | McFarland |
| 2012/0228147 A1 | 9/2012 | Sivasankar et al. |
| 2012/0277465 A1 | 11/2012 | Cole et al. |
| 2012/0292196 A1 | 11/2012 | Albrecht et al. |
| 2012/0295172 A1 | 11/2012 | Peled et al. |
| 2012/0298522 A1 | 11/2012 | Shipchandler et al. |
| 2012/0329657 A1 | 12/2012 | Eastman et al. |
| 2013/0062216 A1 | 3/2013 | Yotsuhashi et al. |
| 2013/0098772 A1 | 4/2013 | Bocarsly et al. |
| 2013/0105304 A1 | 5/2013 | Kaczur et al. |
| 2013/0105330 A1 | 5/2013 | Teamey et al. |
| 2013/0118907 A1 | 5/2013 | Deguchi et al. |
| 2013/0118911 A1 | 5/2013 | Sivasankar et al. |
| 2013/0134048 A1 | 5/2013 | Teamey et al. |
| 2013/0134049 A1 | 5/2013 | Teamey et al. |
| 2013/0140187 A1 | 6/2013 | Teamey et al. |
| 2013/0180863 A1 | 7/2013 | Kaczur et al. |
| 2013/0180865 A1 | 7/2013 | Cole et al. |
| 2013/0186771 A1 | 7/2013 | Zhai et al. |
| 2013/0199937 A1 | 8/2013 | Cole et al. |

FOREIGN PATENT DOCUMENTS

| | | |
|---|---|---|
| CN | 102190573 A | 9/2011 |
| DE | 1047765 A | 12/1958 |
| DE | 2301032 A | 7/1974 |
| EP | 0028430 A1 | 5/1981 |
| EP | 0111870 B1 | 12/1983 |
| EP | 0081982 B1 | 5/1985 |
| EP | 0277048 B1 | 3/1988 |
| EP | 0390157 B1 | 5/2000 |
| EP | 2329875 A1 | 6/2011 |
| FR | 853643 | 3/1940 |
| FR | 2780055 A1 | 12/1999 |
| GB | 1285209 A | 8/1972 |
| JP | 62120489 A | 6/1987 |
| JP | 64-015388 | 1/1989 |
| JP | 07258877 A | 10/1995 |
| JP | 2004344720 A | 12/2004 |
| JP | 2006188370 A | 7/2006 |
| JP | 2007185096 A | 7/2007 |
| KR | 20040009875 A | 1/2004 |
| WO | 91/01947 A1 | 2/1991 |
| WO | WO 9724320 A1 | 7/1997 |
| WO | 9850974 A1 | 11/1998 |
| WO | WO9850974 A1 | 11/1998 |
| WO | WO 0015586 A1 | 3/2000 |
| WO | WO0025380 A2 | 5/2000 |
| WO | WO02059987 A3 | 8/2002 |
| WO | WO 03004727 A2 | 1/2003 |
| WO | WO 2004/067673 A1 | 8/2004 |
| WO | 2007041872 A1 | 4/2007 |
| WO | WO 2007041872 A1 | 4/2007 |
| WO | WO2007041872 A1 | 4/2007 |
| WO | WO2007058608 A1 | 5/2007 |
| WO | 2007/091616 A1 | 8/2007 |
| WO | WO2007119260 A2 | 10/2007 |
| WO | WO2008016728 A2 | 2/2008 |
| WO | WO2008017838 A1 | 2/2008 |
| WO | WO2008124538 A1 | 10/2008 |
| WO | WO2009002566 A1 | 12/2008 |
| WO | 2009108327 A1 | 9/2009 |
| WO | WO2009145624 A1 | 12/2009 |
| WO | WO2010010252 A2 | 1/2010 |
| WO | WO2010042197 A1 | 4/2010 |
| WO | WO2010088524 A2 | 8/2010 |
| WO | WO2010138792 A1 | 12/2010 |
| WO | WO2011010109 A1 | 1/2011 |
| WO | WO2011068743 A2 | 6/2011 |
| WO | 2011116236 A2 | 9/2011 |
| WO | WO2011120021 A1 | 9/2011 |
| WO | WO2011123907 A1 | 10/2011 |
| WO | WO2011133264 A1 | 10/2011 |
| WO | 2011160577 A1 | 12/2011 |
| WO | 2012015921 A1 | 2/2012 |
| WO | WO 2012046362 A1 | 4/2012 |
| WO | 2012166997 A2 | 12/2012 |

OTHER PUBLICATIONS

Hori et al, chapter on "Electrochemical CO2 Reduction on Metal Electrodes," in the book Modern Aspects of Electrochemistry, vol. 42, pp. 106 and 107.*

Czerwinski et al, "Adsorption Study of CO2 on Reticulated vitreous carbon (RVC) covered with platinum," Analytical Letters, vol. 18, Issue 14 (1985), pp. 1717-1722.*

Hammouche et al, Chemical Catalysis of Electrochemical Reactions. Homogeneous Catalysis of the Electrochemical Reduction of Carbon Dioxide by Iron ("0") Porphyrins. Role of the Addition of Magnesium Cations. J. Am. Chem. Soc. 1991, 113, 8455-8466.*

Hossain et al, "Palladium and Cobalt Complexes of Substituted Quinoline, Bipyridine and Phenanthroline as Catalysts for Electrochemical Reduction of Carbon Dioxide,"Electrochimica Acta, vol. 42, No. 16 (1997), pp. 2577-2585.*

Hori et al, "Enhanced Formation of Ethylene and Alcohols at Ambient Temperature and Pressure in Electrochemical Reduction of Carbon Dioxide at a Copper Electrode," J. Chem. Soc. Chem. Commun. (1988), pp. 17-19.*

Cook, MacDuff, and Sammells; High Rate Gas Phase CO2 Reduction to Ethylene and Methane Using Gas Diffusion Electrodes, J. Electrochem. Soc., vol. 137, No. 2, pp. 607-608, Feb. 1990, © The Electrochemical Society, Inc.

Daube, Harrison, Mallouk, Ricco, Chao, Wrighton, Hendrickson, and Drube; Electrode-Confined Catalyst Systems for Use in Optical-to-Chemical Energy Conversion; Journal of Photochemistry, vol. 29, 1985, pp. 71-88.

Dewulf, Jin, and Bard; Electrochemical and Surface Studies of Carbon Dioxide Reduction to Methane and Ethylene at Copper Electrodes in Aqueous Solutions; J. Electrochem. Soc., vol. 136, No. 6, Jun. 1989, pp. 1686-1691, © The Electrochemical Society, Inc.

J. Augustynski, P. Kedzierzawski, and B. Jermann, Electrochemical Reduction of CO2 at Metallic Electrodes, Studies in Surface Science and Catalysis, vol. 114, pp. 107-116, © 1998 Elsevier Science B.V.

Sung-Woo Lee, Jea-Keun Lee, Kyoung-Hag Lee, and Jun-Heok Lim, Electrochemical reduction of CO and H2 from carbon dioxide in aqua-solution, Current Applied Physics, vol. 10, 2010, pp. S51-S54.

Andrew P. Abbott and Christopher A. Eardley, Electrochemical Reduction of CO2 in a Mixed Supercritical Fluid, J. Phys. Chem. B, 2000, vol. 104, pp. 775-779.

(56) References Cited

OTHER PUBLICATIONS

Matthew R. Hudson, Electrochemical Reduction of Carbon Dioxide, Dec. 9, 2005, pp. 1-15.
S. Kapusta and N. Hackerman, The Electroreduction of Carbon Dioxide and Formic Acid on Tin and Indium Electrodes, J. Electrochem. Soc.: Electrochemical Science and Technology, Mar. 1983, pp. 607-613.
M Aulice Scibioh and B Viswanathan, Electrochemical Reduction of Carbon Dioxide: A Status Report, Proc Indian Natn Sci Acad, vol. 70, A, No. 3, May 2004, pp. 1-56.
N. L. Weinberg, D. J. Mazur, Electrochemical hydrodimerization of formaldehyde to ethylene glycol, Journal of Applied Electrochemistry, vol. 21, 1991, pp. 895-901.
R.P.S. Chaplin and A.A. Wragg, Effects of process conditions and electrode material on reaction pathways for carbon dioxide electroreduction with particular reference to formate formation, Journal of Applied Electrochemistry vol. 33, pp. 1107-1123, 2003, © 2003 Kluwer Academic Publishers. Printed in the Netherlands.
M.N. Mahmood, D. Masheder, and C.J. Harty, Use of gas-diffusion electrodes for high-rate electrochemical reduction of carbon dioxide. I. Reduction at lead, indium- and tin-impregnated electrodes, Journal of Applied Electrochemistry, vol. 17, 1987, pp. 1159-1170.
Summers, Leach, and Frese, The Electrochemical Reduction of Aqueous Carbon Dioxide to Methanol at Molybdenum Electrodes with Low Overpotentials, J. Electroanal. Chem., vol. 205, 1986, pp. 219-232, Elseiver Sequoia S.A., Lausanne—Printed in The Netherlands.
Frese and Leach, Electrochemical Reduction of Carbon Dioxide to Methane, Methanol, and CO on Ru Electrodes, Journal of the Electrochemical Society, Jan. 1985, pp. 259-260.
Frese and Canfield, Reduction of $CO_2$ on n-GaAs Electrodes and Selective Methanol Synthesis, J. Electrochem. Soc.: Electrochemical Science and Technology, vol. 131, No. 11, Nov. 1984, pp. 2518-2522.
Shibata, Yoshida, and Furuya, Electrochemical Synthesis of Urea at Gas-Diffusion Electrodes, J. Electrochem. Soc., vol. 145, No. 2, Feb. 1998, © The Electrochemical Society, Inc., pp. 595-600.
Shibata and Furuya, Simultaneous reduction of carbon dioxide and nitrate ions at gas-diffusion electrodes with various metal-lophthalocyanine catalysts, Electrochimica Acta 48, 2003, pp. 3953-3958.
M. Gattrell, N. Gupta, and A. Co, A Review of the aqueous electrochemical reduction of $CO_2$ to hydrocarbons at copper, Journal of Electroanalytical Chemistry, vol. 594, 2006, pp. 1-19.
Mahmood, Masheder, and Harty; Use of Gas-Diffusion Electrodes for High-Rate Electrochemical Reduction of Carbon Dioxide. II. Reduction at Metal Phthalocyanine-impregnated Electrodes; Journal of Applied Electrochemistry, vol. 17, 1987, pp. 1223-1227.
Gennaro, Isse, Saveant, Severin, and Vianello; Homogeneous Electron Transfer Catalysis of the Electrochemical Reduction of Carbon Dioxide. Do Aromatic Anion Radicals React in an Outer-Sphere Manner?; J. Am. Chem. Soc., 1996, vol. 118, pp. 7190-7196.
J. Giner, Electrochemical Reduction of $CO_2$ on Platinum Electrodes in Acid Solutions, Electrochimica Acta, 1963, vol. 8, pp. 857-865, Pregamon Press Ltd., Printed in Northern Ireland.
John Leonard Haan, Electrochemistry of Formic Acid and Carbon Dioxide on Metal Electrodes with Applications to Fuel Cells and Carbon Dioxide Conversion Devices, 2010, pp. 1-205.
M. Halmann, Photoelectrochemical reduction of aqueous carbon dioxide on p-type gallium phosphide in liquid junction solar cells, Nature, vol. 275, Sep. 14, 1978, pp. 115-116.
H. Ezaki, M. Morinaga, and S. Watanabe, Hydrogen Overpotential for Transition Metals and Alloys, and its Interpretation Using an Electronic Model, Electrochimica Acta, vol. 38, No. 4, 1993, pp. 557-564, Pergamon Press Ltd., Printed in Great Britain.
K.S. Udupa, G.S. Subramanian, and H.V.K. Udupa, The Electrolytic Reduction of Carbon Dioxide to Formic Acid, Electrochimica Acta, 1971, vol. 16, pp. 1593-1598, Pergamon Press., Printed in Northern Ireland.

Ougitani, Aizawa, Sonoyama, and Sakata; Temperature Dependence of the Probability of Chain Growth for Hydrocarbon Formation by Electrochemical Reduction of $CO_2$, Bull. Chem. Soc. Jpn., vol. 74, pp. 2119-2122, 2001.
Furuya, Yamazaki, and Shibata; High performance Ru-Pd catalysts for $CO_2$ reduction at gas-diffusion electrodes, Journal of Electroanalytical Chemistry, vol. 431, 1997, pp. 39-41.
R. Hinogami, Y. Nakamura, S. Yae, and Y. Nakato; An Approach to Ideal Semiconductor Electrodes for Efficient Photoelectrochemical Reduction of Carbon Dioxide by Modification with Small Metal Particles, J. Phys. Chem. B, 1998, vol. 102, pp. 974-980.
Reda, Plugge, Abram, and Hirst; Reversible interconversion of carbon dioxide and formate by an electroactive enzyme, PNAS, Aug. 5, 2008, vol. 105, No. 31, pp. 10654-10658, www.pnas.org/cgi/doi/10.1073pnas.0801290105.
Y. Hori, Electrochemical $CO_2$ Reduction on Metal Electrodes, Modern Aspects of Electrochemistry, No. 42, edited by C. Vayenas et al., Springer, New York, 2008, pp. 89-189.
Hori, Yoshio; Suzuki, Shin, Cathodic Reduction of Carbon Dioxide for Energy Storage, Journal of the Research Institute for Catalysis Hokkaido University, 30(2): 81-88, 1983-02, http://hdl.handle.net/2115125131.
Hori, Wakebe, Tsukamoto, and Koga; Electrocatalytic Process of CO Selectivity in Electrochemical Reduction Of $CO_2$ at Metal Electrodes in Aqueous Media, Electrochimica Acta, vol. 39, No. 11/12, pp. 1833-1839, 1994, Copyright 1994 Elsevier Science Ltd.,Pergamon, Printed in Great Britain.
Hori, Kikuchi, and Suzuki; Production of CO and $CH_4$ in Electrochemical Reduction of $CO_2$ at Metal Electrodes in Aqueous Hydrogencarbonate Solution; Chemistry Letters, 1985, pp. 1695-1698, Copyright 1985 The Chemical Society of Japan.
Hori, Kikuchi, Murata, and Suzuki; Production of Methane and Ethylene in Electrochemical Reduction of Carbon Dioxide at Copper Electrode in Aqueous Hydrogencarbonate Solution; Chemistry Letters, 1986, pp. 897-898, Copyright 1986 The Chemical Society of Japan.
Hoshi, Suzuki, and Hori; Step Density Dependence of $CO_2$ Reduction Rate on Pt(S)-[n(111) x (111)] Single Crystal Electrodes, Electrochimica Acta, vol. 41, No. 10, pp. 1617-1653, 1996, Copyright 1996 Elsevier Science Ltd. Printed in Great Britain.
Hoshi, Suzuki, and Hori; Catalytic Activity of $CO_2$ Reduction on Pt Single-Crystal Electrodes: Pt(S)-[n(111)x(111)], Pt(S)-[n(111)x(100)], and Pt(S)-[n(100)x(111)], J. Phys. Chem. B, 1997, vol. 101, pp. 8520-8524.
Ikeda, Saito, Yoshida, Noda, Maeda, and Ito; Photoelectrochemical reduction products of carbon dioxide at metal coated p-GaP photocathodes in non-aqueous electrolytes, J. Electroanal. Chem., 260 (1989) pp. 335-345, Elsevier Sequoia S.A., Lausanne—Printed in The Netherlands.
Noda, Ikeda, Oda, Imai, Maeda, and Ito; Electrochemical Reduction of Carbon Dioxide at Various Metal Electrodes in Aqueous Potassium Hydrogen Carbonate Solution, Bull. Chem. Soc. Jpn., 63, pp. 2459-2462, 1990, Copyright 1990 The Chemical Society of Japan.
S.R. Narayanan, B. Haines, J. Soler, and T.I. Valdez; Electrochemical Conversion of Carbon Dioxide to Formate in Alkaline Polymer Electrolyte Membrane Cells, Journal of The Electrochemical Society, 158 (2) A167-A173 (2011).
Tooru Inoue, Photoelectrocatalytic reduction of carbon dioxide in aqueous suspensions of semiconductor powders, Nature, vol. 277, Feb. 22, 1979, pp. 637-638.
B. Jermann and J. Augustynski, Long-Term Activation of the Copper Cathode in the Course of $CO_2$ Reduction, Electrochimica Acta, vol. 39, No. 11/12, pp. 1891-1896, 1994, Elsevier Science Ltd., Printed in Great Britain.
Jitaru, Lowy, M. Toma, B.C. Toma, and L. Oniciu; Electrochemical reduction of carbon dioxide on flat metallic cathodes; Journal of Applied Electrochemistry 27 (1997) 875-889, Reviews in Applied Electrochemistry No. 45.
Maria Jitaru, Electrochemical Carbon Dioxide Reduction—Fundamental and Applied Topics (Review), Journal of the University of Chemical Technology and Metallurgy, 42, 4, 2007, 333-344.

(56) References Cited

OTHER PUBLICATIONS

Kaneco, Katsumata, Suzuki, and Ohta; Photoelectrocatalytic reduction of CO2 in LiOH/methanol at metal-modified p-InP electrodes, Applied Catalysis B: Environmental 64 (2006) 139-145.
J.J. Kim, D.P. Summers, and K.W. Frese, Jr; Reduction of CO2 and CO to Methane on Cu Foil Electrodes, J. Electroanal. Chem., 245 (1988) 223-244, Elsevier Sequoia S.A., Lausanne—Printed in The Netherlands.
Osamu Koga and Yoshio Hori, Reduction of Adsorbed CO on a Ni Electrode in Connection With the Electrochemical Reduction of CO2, Electrochimica Acta, vol. 38, No. 10, pp. 1391-1394,1993, Printed in Great Britain.
Breedlove, Ferrence, Washington, and Kubiak; A photoelectrochemical approach to splitting carbon dioxide for a manned mission to Mars, Materials and Design 22 (2001) 577-584, © 2001 Elsevier Science Ltd.
Simon-Manso and Kubiak, Dinuclear Nickel Complexes as Catalysts for Electrochemical Reduction of Carbon Dioxide, Organometallics 2005, 24, pp. 96-102, © 2005 American Chemical Society.
Kushi, Nagao, Nishioka, Isobe, and Tanaka; Remarkable Decrease in Overpotential of Oxalate Formation in Electrochemical C02 Reduction by a Metal-Sulfide Cluster, J. Chem. Soc., Chem. Commun., 1995, pp. 1223-1224.
Kuwabata, Nishida, Tsuda, Inoue, and Yoneyama; Photochemical Reduction of Carbon Dioxide to Methanol Using ZnS Microcrystallite as a Photocatalyst in the Presence of Methanol Dehydrogenase, J. Electrochem. Soc., vol. 141, No. 6, pp. 1498-1503, Jun. 1994, © The Electrochemical Society, Inc.
Shibata et al., "Simultaneous Reduction of Carbon Dioxide and Nitrate Ions at Gas-Diffusion Electrodes with Various Metallophthalocyanine Catalysts", Electrochima Acta (no month, 2003), vol. 48, pp. 3953-3958.
Shibata et al., "Electrochemical Synthesis of Urea at Gas-Diffusion Electrodes", J. Electrochem. Soc. (Jul. 1998), vol. 145, No. 7, pp. 2348-2353.
Non-Final Office Action for U.S. Appl. No. 12/875,227, dated Dec. 11, 2012.
Jean-Marie Lehn and Raymond Ziessel, Photochemical generation of carbon monoxide and hydrogen by reduction of carbon dioxide and water under visible light irradiation, Proc. Natl. Acad. Sci. USA, vol. 79, pp. 701-704, Jan. 1982, Chemistry.
Li and Prentice, Electrochemical Synthesis of Methanol from CO2 in High-Pressure Electrolyte, J. Electrochem. Soc., vol. 144, No. 12, Dec. 1997 © The Electrochemical Society, Inc., pp. 4284-4288.
Azuma, Hashimoto, Hiramoto, Watanabe, and Sakata; Carbon dioxide reduction at low temperature on various metal electrodes, J. Electroanal. Chem., 260 (1989) 441-445, Elsevier Sequoia S.A., Lausanne—Printed in The Netherlands.
Goettmann, Thomas, and Antonietti; Metal-Free Activation of CO2 by Mesoporous Graphitic Carbon Nitride; Angewandte Chemie; Angew. Chem. Int. Ed. 2007, 46, 2717-2720.
Yu B Vassiliev, V S Bagotzky, O.A. Khazova and Na Mayorova; Electroreduction of Carbon Dioxide Part II. The Mechanism of Reduction in Aprotic Solvents, J Electroanal. Chem, 189 (1985) 295-309. Elsevier Sequoia S.A. , Lausanne—Printed in The Netherlands.
Whipple, Finke, and Kenis; Microfluidic Reactor for the Electrochemical Reduction of Carbon Dioxide: The Effect of pH; Electrochemical and Solid-State Letters, 13 (9) B109-B111 (2010), 1099-0062/2010/13(9)/B109/3/$28.00 © The Electrochemical Society.
Zhai, Chiachiarelli, and Sridhar; Effects of Gaseous Impurities on the Electrochemical Reduction of CO2 on Copper Electrodes; ECS Transactions, 19 (14) 1-13 (2009), 10.1149/1.3220175 © The Electrochemical Society.
R.D.L. Smith, P.G. Pickup, Nitrogen-rich polymers for the electrocatalytic reduction of CO2, Electrochem. Commun. (2010), doi:10.1016/j.elecom.2010.10.013.
B.Z. Nikolic, H. Huang, D. Gervasio, A. Lin, C. Fierro, R.R. Adzic, and E.B. Yeager; Electroreduction of carbon dioxide on platinum single crystal electrodes: electrochemical and in situ FTIR studies; J. Electmanal. Chem., 295 (1990) 415-423; Elsevier Sequoia S.A., Lausanne.
Nogami, Itagaki, and Shiratsuchi; Pulsed Electroreduction of CO2 on Copper Electrodes-II; J. Electrochem. Soc., vol. 141, No. 5, May 1994 © The Electrochemical Society, Inc., pp. 1138-1142.
Ichiro Oda, Hirohito Ogasawara, and Masatoki Ito; Carbon Monoxide Adsorption on Copper and Silver Electrodes during Carbon Dioxide Electroreduction Studied by Infrared Reflection Absorption Spectroscopy and Surface-Enhanced Raman Spectroscopy; Langmuir 1996, 12, 1094-1097.
Kotaro Ogura Kenichi Mine, Jun Yano, and Hideaki Sugihara; Electrocatalytic Generation of C2 and C3 Compounds from Carbon Dioxide on a Cobalt Complex-immobilized Dual-film Electrode; J . Chem. Soc., Chem. Commun., 1993, pp. 20-21.
Ohkawa, Noguchi, Nakayama, Hashimoto, and Fujishima; Electrochemical reduction of carbon dioxide on hydrogen-storing materials Part 3. The effect of the absorption of hydrogen on the palladium electrodes modified with copper; Journal of Electroanalytical Chemistry, 367 (1994) 165-173.
Sanchez-Sanchez, Montiel, Tryk, Aldaz, and Fujishima; Electrochemical approaches to alleviation of the problem of carbon dioxide accumulation; Pure Appl. Chem., vol. 73, No. 12, pp. 1917-1927, 2001, © 2001 IUPAC.
D. J. Pickett and K. S. Yap, A study of the production of glyoxylic acid by the electrochemical reduction of oxalic acid solutions, Journal of Applied Electrochemistry 4 (1974) 17-23, Printed in Great Britain, © 1974 Chapman and Hall Ltd.
Bruce A. Parkinson & Paul F. Weaver, Photoelectrochemical pumping of enzymatic CO2 reduction, Nature, vol. 309, May 10, 1984, pp. 148-149.
Paul, Tyagi, Bilakhiya, Bhadbhade, Suresh, and Ramachandraiah; Synthesis and Characterization of Rhodium Complexes Containing 2,4,6-Tris(2-pyridyl)-1,3,5-triazine and Its Metal-Promoted Hydrolytic Products: Potential Uses of the New Complexes in Electrocatalytic Reduction of Carbon Dioxide; Inorg. Chem. 1998, 37, 5733-5742.
Furuya, Yamazaki, and Shibata; High performance Ru-Pd catalysts for CO2 reduction at gas-diffusion electrodes, Journal of Electroanalytical Chemistry 431 (1997) 39-41.
Petit, Chartier, Beley, and Deville; Molecular catalysts in photoelectrochemical cells Study of an efficient system for the selective photoelectroreduction of CO2: p-GaP or p-GaAs / Ni( cyclam) 2+, aqueous medium; J. Electroanal. Chem., 269 (1989) 267-281; Elsevier Sequoia S.A., Lausanne—Printed in The Netherlands.
Popic, Avramov-Ivic, and Vukovic; Reduction of carbon dioxide on ruthenium oxide and modified ruthenium oxide electrodes in 0.5 M NaHCO3, Journal of Electroanalytical Chemistry 421 (1997) 105-110.
Whipple and Kenis, Prospects of CO2 Utilization via Direct Heterogeneous Electrochemical Reduction, J. Phys. Chem. Lett. 2010, 1, 3451-3458, © 2010 American Chemical Society.
P.A. Christensen & S.J. Higgins, Preliminary note the electrochemical reduction of CO2 to oxalate at a Pt electrode immersed in acetonitrile and coated with polyvinylalcohol/[Ni(dppm)2CI2], Journal of Electroanalytical Chemistry, 387 (1995) 127-132.
Qu, Zhang, Wang, and Xie; Electrochemical reduction of CO2 on RuO2/TiO2 nanotubes composite modified Pt electrode, Electrochimica Acta 50 (2005) 3576-3580.
Jin, Gao, Jin, Zhang, Cao, ; Wei, and Smith; High-yield reduction of carbon dioxide into formic acid by zero-valent metal/metal oxide redox cycles; Energy Environ. Sci., 2011, 4, pp. 881-884.
Yu B Vassiliev, V S Bagotzky. N. V Osetrova and A A Mikhailova; Electroreduction of Carbon Dioxide Part III. Adsorption and Reduction of CO2 on Platinum Metals; J Electroanal Chem. 189 (1985) 311-324, Elsevier Sequoia SA, Lausanne—Printed in The Netherlands.
M. Gattrell, N. Gupta, and A. Co; A review of the aqueous electrochemical reduction of CO2 to hydrocarbons at copper; Journal of Electroanalytical Chemistry 594 (2006) 1-19.
Hoshi, Ito, Suzuki, and Hori; Preliminary note CO 2 Reduction on Rh single crystal electrodes and the structural effect; Journal of Electroanalytical Chemistry 395 (1995) 309-312.

(56) References Cited

OTHER PUBLICATIONS

Rudolph, Dautz, and Jager; Macrocyclic [N42-] Coordinated Nickel Complexes as Catalysts for the Formation of Oxalate by Electrochemical Reduction of Carbon Dioxide; J. Am. Chem. Soc. 2000, 122, 10821-10830, Published on Web Oct. 21, 2000.

Ryu, Andersen, and Eyring; The Electrode Reduction Kinetics of Carbon Dioxide in Aqueous Solution; The Journal of Physical Chemistry, vol. 76, No. 22, 1972, pp. 3278-3286.

Zhao, Jiang, Han, Li, Zhang, Liu, Hi, and Wu; Electrochemical reduction of supercritical carbon dioxide in ionic liquid 1-n-butyl-3-methylimidazolium hexafluorophosphate; J. of Supercritical Fluids 32 (2004) 287-291.

Schwartz, Cook, Kehoe, MacDuff, Patel, and Sammells; Carbon Dioxide Reduction to Alcohols using Perovskite-Type Electrocatalysts; J. Electrochem. Soc., vol. 140, No. 3, Mar. 1993 © The Electrochemical Society, Inc., pp. 614-618.

Ikeda, Takagi, and Ito; Selective Formation of Formic Acid, Oxalic Acid, and Carbon Monoxide by Electrochemical Reduction of Carbon Dioxide; Bull. Chem. Soc. Jpn., 60, 2517-2522 (1987) © 1987 The Chemical Society of Japan.

Seshadri, Lin, and Bocarsly; A new homogeneous electrocatalyst for the reduction of carbon dioxide to methanol at low overpotential; Journal of Electroanalytical Chemistry, 372 (1994) 145-150.

Shiratsuchi, Aikoh, and Nogami; Pulsed Electroreduction of $CO_2$ on Copper Electrodes; J, Electrochem. Soc., vol. 140, No. 12, Dec. 1993 © The Electrochemical Society, Inc.

Centi & Perathoner; Towards Solar Fuels from Water and $CO_2$; ChemSusChem 2010, 3, 195-208, © 2010 Wiley-VCH Verlag GmbH& Co. KGaA, Weinheim.

David P. Summers, Steven Leach and Karl W. Frese Jr.; The Electrochemical Reduction of Aqueous Carbon Dioxide to Methanol at Molybdenum Electrodes With Low Overpotentials; J Electroanal. Chem., 205 (1986) 219-232, Elsevier Sequoia S.A., Lausanne—Printed in The Netherlands.

Isao Taniguchi, Benedict Aurian-Blajeni and John O'M. Bockris; Photo-Aided Reduction of Carbon Dioxide to Carbon Monoxide; J. Electroanal. Chem, 157 (1983) 179-182, Elsevier Sequoia S.A., Lausanne—Printed in The Netherlands.

Isao Taniguchi, Benedict Aurian-Blajeni and John O'M. Bockris; The Mediation of the Photoelectrochemical Reduction of Carbon Dioxide by Ammonium Ions; J. Electroanal. Chem, 161 (1984) 385-388, Elsevier Sequoia S.A., Lausanne—Printed in The Netherlands.

Hiroshi Yoneyama, Kenji Sugimura and Susumu Kuwabata; Effects of Electrolytes on the Photoelectrochemical Reduction of Carbon Dioxide at Illuminated p-Type Cadmium Telluride and p-Type Indium Phosphide Electrodes in Aqueous Solutions; J. Electroanal. Chem., 249 (1988) 143-153, Elsevier Sequoia ,S.A., Lausanne—Printed in The Netherlands.

Whipple, Finke, and Kenis; Microfluidic Reactor for the Electrochemical Reduction of Carbon Dioxide: The Effect of pH; Electrochemical and Solid-State Letters, 13 (9) B109-B111 (2010).

YLB Vassiliev, V S Bagotzky, N V. Osetrov, O.A. Khazova and NA Mayorova; Electroreduction of Carbon Dioxide Part I. The Mechanism and Kinetics of Electroreduction of $CO_2$ in Aqueous Solutions on Metals with High and Moderate Hydrogen Overvoltages; J Electroanal. Chem. 189 (1985) 271-294, Elsevier Sequoia SA , Lausanne—Printed in The Netherlands.

YLB Vassiliev, V S Bagotzky, N V. Osetrov, O.A. Khazova and NA Mayorova; Electroreduction of Carbon Dioxide Part II. The Mechanism of Reduction in Aprotic Solvents; J Electroanal. Chem. 189 (1985) 295-309, Elsevier Sequoia Sa , Lausanne—Printed in The Netherlands.

Watanabe, Shibata, Kato, Azuma, and Sakata; Design of Alloy Electrocatalysts for $CO_2$ Reduction III. The Selective and Reversible Reduction of $CO_2$ on Cu Alloy Electrodes; J. Electrochem. Soc., vol. 138, No. 11, Nov. 1991 © The Electrochemical Society, Inc., pp. 3382-3389.

Soichiro Yamamura, Hiroyuki Kojima, Jun Iyoda and Wasaburo Kawai; Photocatalytic Reduction of Carbon Dioxide with Metal-Loaded SiC Powders; J. Eleciroanal. Chem., 247 (1988) 333-337, Elsevier Sequoia S.A., Lausanne—Printed in The Netherlands.

R. Piercy, N. A. Hampson; The electrochemistry of indium, Journal of Applied Electrochemistry 5 (1975) 1-15, Printed in Great Britain, © 1975 Chapman and Hall Ltd.

C. K. Watanabe, K. Nobe; Electrochemical behaviour of indium in $H2S04$, Journal of Applied Electrochemistry 6 (1976) 159-162, Printed in Great Britain, © 1976 Chapman and Hall Ltd.

Yumi Akahori, Nahoko Iwanaga, Yumi Kato, Osamu Hamamoto, and Mikita Ishii; New Electrochemical Process for $CO_2$ Reduction to from Formic Acid from Combustion Flue Gases; Electrochemistry; vol. 72, No. 4 (2004), pp. 266-270.

Hamamoto, Akahori, Goto, Kato, and Ishii; Modified Carbon Fiber Electrodes for Carbon Dioxide Reduction; Electrochemistry, vol. 72, No. 5 (2004), pp. 322-327.

S. Omanovicâ, M. Metikosï-Hukovic; Indium as a cathodic material: catalytic reduction of formaldehyde; Journal of Applied Electrochemistry 27 (1997) 35-41.

Hara, Kudo, and Sakata; Electrochemical reduction of carbon dioxide under high pressure on various electrodes in an aqueous electrolyte; Journal of Electroanalytical Chemistry 391 (1995) 141-147.

Stephen K. Ritter, What Can We Do With Carbon Dioxide? Scientists are trying to find ways to convert the plentiful greenhouse gas into fuels and other value-added products, Chemical & Engineering News, Apr. 30, 2007, vol. 85, No. 18, pp. 11-17, http://pubs.acs.org/cen/coverstory/85/8518cover.html.

Toshio Tanaka, Molecular Orbital Studies on the Two-Electron Reduction of Carbon Dioxide to Give Formate Anion, Memoirs of Fukui University of Technology, vol. 23, Part 1, 1993, pp. 223-230.

Columbia, Crabtree, and Thiel; The Temperature and Coverage Dependences of Adsorbed Formic Acid and Its Conversion to Formate on Pt(111), J. Am. Chem. Soc., vol. 114, No. 4, 1992, pp. 1231-1237.

Brian R. Eggins and Joanne McNeill, Voltammetry of Carbon Dioxide, Part I. A General Survey of Voltammetry at Different Electrode Materials in Different Solvents, J. Electroanal. Chem., 148 (1983) 17-24, Elsevier Sequoia S.A., Lausanne—Printed in The Netherlands.

Varghese, Paulose, Latempa, and Grimes; High-Rate Solar Photocatalytic Conversion of $CO_2$ and Water Vapor to Hydrocarbon Fuels; Nano Letters, 2009, vol. 9, No. 2, pp. 731-737.

Han, Chu, Kim, Song, and Kim; Photoelectron spectroscopy and ab initio study of mixed cluster anions of [(CO21-3(Pyridine)1-6: Formation of a covalently bonded anion core of (C5H5N—CO2), Journal of Chemical Physics, vol. 113, No. 2, 8 Jul. 2000, pp. 596-601.

Heinze, Hempel, and Beckmann; Multielectron Storage and Photo-Induced Electron Transfer in Oligonuclear Complexes Containing Ruthenium(II) Terpyridine and Ferrocene Building Blocks, Eur. J. Inorg. Chem. 2006, 2040-2050.

Lin and Frei, Bimetallic redox sites for photochemical $CO_2$ splitting in mesoporous silicate sieve, C. R. Chimie 9 (2006) 207-213.

Heyduk, MacIntosh, and Nocera; Four-Electron Photochemistry of Dirhodium Fluorophosphine Compounds, J. Am. Chem. Soc. 1999, 121, 5023-5032.

Witham, Huang, Tsung, Kuhn, Somorjai, and Toste; Converting homogeneous to heterogeneous in electrophilic catalysis using monodisperse metal nanoparticles, Nature Chemistry, DOI: 10.1038/NCHEM.468, pp. 1-6, 2009.

Hwang and Shaka, Water Suppression That Works. Excitation Sculpting Using Arbitrary Waveforms and Pulsed Field Gradients, Journal of Magnetic Resonance, Series A 112, 275-279 (1995).

Weissermel and Arpe, Industrial Organic Chemistry, 3rd Edition 1997, Published jointly by VCH Verlagsgesellschaft mbH, Weinheim (Federal Republic of Germany) VCH Pubiishers, Inc., New York, NY (USA), pp. 1-481.

T. Iwasita, . C. Nart, B. Lopez and W. Vielstich; on the Study of Adsorbed Species at Platinum From Methanol, Formic Acid and Reduced Carbon Dioxide Via In Situ FT-ir Spectroscopy, Electrochimica Atca, vol. 37. No. 12. pp. 2361-2367, 1992, Printed in Great Britain.

Lackner, Grimes, and Ziock; Capturing Carbon Dioxide From Air; pp. 1-15.

(56) References Cited

OTHER PUBLICATIONS

Kang, Kim, Lee, Hong, and Moon; Nickel-based tri-reforming catalyst for the production of synthesis gas, Applied Catalysis, A: General 332 (2007) 153-158.

Kostecki and Augustynski, Electrochemical Reduction of CO2 at an Activated Silver Electrode, Ber. Bunsenges. Phys. Chem. 98, 1510-1515 (1994) No. I2 C VCH Verlagsgesellschaft mbH, 0-69451 Weinheim, 1994.

Kunimatsu and Kita; Infrared Spectroscopic Study of Methanol and Formic Acid Adsorrates on a Platinum Electrode, Part II. Role of the Linear CO(a) Derived From Methanol and Formic Acid in the Electrocatalytic Oxidation of CH,OH and HCOOH, J Electroanal Chem., 218 (1987) 155-172, Elsevier Sequoia S A , Lausanne—Printed in The Netherlands.

Lichter and Roberts, 15N Nuclear Magnetic Resonance Spectroscopy. XIII. Pyridine-15N1, Journal of the American Chemical Society 1 93:20 1 Oct. 6, 1971, pp. 5218-5224.

R.J.L. Martin, The Mechanism of the Cannizzaro Reaction of Formaldehyde, May 28, 1954, pp. 335-347.

Fujitani, Nakamura, Uchijima, and Nakamura; The kinetics and mechanism of methanol synthesis by hydrogenation of C02 over a Zn-deposited Cu(111surface, Surface Science 383 (1997) 285-298.

Richard S. Nicholson and Irving Shain, Theory of Stationary Electrode Polarography, Single Scan and Cyclic Methods Applied to Reversible, Irreversible, and Kinetic Systems, Analytical Chemistry, vol. 36, No. 4, Apr. 1964, pp. 706-723.

Noda, Ikeda, Yamamoto, Einaga, and Ito; Kinetics of Electrochemical Reduction of Carbon Dioxide on a Gold Electrode in Phosphate Buffer Solutions; Bull. Chem. Soc. Jpn., 68, 1889-1895 (1995).

Joseph W. Ochterski, Thermochemistry in Gaussian, (c)2000, Gaussian, Inc., Jun. 2, 2000, 19 Pages.

Kotaro Ogura and Mitsugu Takagi, Electrocatalytic Reduction of Carbon Dioxide to Methanol, Part IV. Assessment of the Current-Potential Curves Leading to Reduction, J. Electroanal. Chem., 206 (1986) 209-216, Elsevier Sequoia S.A., Lausanne—Printed in The Netherlands.

Ohkawa, Noguchi, Nakayama, Hashimoto, and Fujishima; Electrochemical reduction of carbon dioxide on hydrogen-storing materials, Part 3. The effect of the absorption of hydrogen on the palladium electrodes modified with copper; Journal of Electroanalytical Chemistry, 367 (1994) 165-173.

Ohmstead and Nicholson, Cyclic Voltammetry Theory for the Disproportionation Reaction and Spherical Diffusion, Analytical Chemistry, vol. 41, No. 6, May 1969, pp. 862-864.

Shunichi Fukuzumi, Bioinspired Energy Conversion Systems for Hydrogen Production and Storage, Eur. J. Inorg. Chem. 2008, 1339-1345.

Angamuthu, Byers, Lutz, Spek, and Bouwman; Electrocatalytic CO2 Conversion to Oxalate by a Copper Complex, Science, vol. 327, Jan. 15, 2010, pp. 313-315.

J. Fischer, Th. Lehmann, and E. Heitz; The production of oxalic acid from CO2 and H2O, Journal of Applied Electrochemistry 11 (1981) 743-750.

Rosenthal, Bachman, Dempsey, Esswein, Gray, Hodgkiss, Manke, Luckett, Pistorio, Veige, and Nocera; Oxygen and hydrogen photocatalysis by two-electron mixed-valence coordination compounds, Coordination Chemistry Reviews 249 (2005) 1316-1326.

Rudolph, Dautz, and Jager; Macrocyclic [N42–] Coordinated Nickel Complexes as Catalysts for the Formation of Oxalate by Electrochemical Reduction of Carbon Dioxide, J. Am. Chem. Soc. 2000, 122, 10821-10830.

D.A. Shirley, High-Resolution X-Ray Photoemission Spectrum of the Valence Bands of Gold, Physical Review B, vol. 5, No. 12, Jun. 15, 1972, pp. 4709-4714.

S.G. Sun and J. Clavilier, The Mechanism of Electrocatalytic Oxidation of Formic Acid on Pt (100) and Pt (111) in Sulphuric Acid Solution: An Emirs Study, J. Electroanal. Chem., 240 (1988) 147-159, Elsevier Sequoia S.A., Lausanne—Printed in The Netherlands.

Sun, Lin, Li, and Mu; Kinetics of dissociative adsorption of formic acid on Pt(100), Pt(610), Pt(210), and Pt(110) single-crystal electrodes in perchloric acid solutions, Journal of Electroanalytical Chemistry, 370 (1994) 273-280.

Marek Szklarczyk, Jerzy Sobkowski and Jolanta Pacocha, Adsorption and Reduction of Formic Acid on p-Type Silicon Electrodes, J. Electroanal. Chem., 215 (1986) 307-316, Elsevier Sequoia S.A., Lausanne—Printed in The Netherlands.

Zhao, Fan, and Wang, Photo-catalytic CO2 reduction using sol-gel derived titania-supported zinc-phthalocyanine, Journal of Cleaner Production 15 (2007) 1894-1897.

Tanaka and OOYAMA, Multi-electron reduction of CO2 via Ru—CO2, —C(O)OH, —CO, —CHO, and —CH2OH species, Coordination Chemistry Reviews 226 (2002) 211-218.

Toyohara, Nagao, Mizukawa, and Tanaka, Ruthenium Formyl Complexes as the Branch Point in Two- and Multi-Electron Reductions of CO2, Inorg. Chem. 1995, 34, 5399-5400.

Watanabe, Shibata, and Kato; Design of Ally Electrocatalysts for CO2 Reduction, III. The Selective and Reversible Reduction of CO2 on Cu Alloy Electrodes; J. Electrochem. Soc., vol. 138, No. 11, Nov. 1991, pp. 3382-3389.

Dr. Chao Lin, Electrode Surface Modification and its Application to Electrocatalysis, V. Catalytic Reduction of Carbon Dioxide to Methanol, Thesis, 1992, Princeton University, pp. 157-179.

Dr. Gayatri Seshadri, Part I. Electrocatalysis at modified semiconductor and metal electrodes; Part II. Electrochemistry of nickel and cadmium hexacyanoferrates, Chapter 2—The Electrocatalytic Reduction of CO2 to Methanol at Low Overpotentials, 1994, Princeton University, pp. 52-85.

Hara et al., "Electrochemical Reduction of Carbon Dioxide Under High Pressure on Various Electrodes in an Aqueous Electrolyte", Journal of Electroanalytical Chemistry (no month, 1995), vol. 391, pp. 141-147.

Yamamoto et al., "Production of Syngas Plus Oxygen From CO2 in a Gas-Diffusion Electrode-Based Electrolytic Cell", Electrochimica Acta (no month, 2002), vol. 47, pp. 3327-3334.

Seshadri et al., "A New Homogeneous Electrocatalyst for the Reduction of Carbon Dioxide to Menthanol at Low Overpotential", Journal of Electroanalytical Chemistry, 372 pp. 145-150, Jul. 8, 1994, figure 1; p. 146-147.

Doherty, "Electrochemical Reduction of Butyraldehyde in the Presence of CO2", Electrochimica Acta 47(2002) 2963-2967.

Udupa et al., "The Electrolytic Reduction of Carbon Dioxide to Formic Acid", Electrochimica Acta (no. month, 1971), vol. 16, pp. 1593-1598.

Jitaru, Maria, "Electrochemical Carbon Dioxide Reduction"—Fundamental and Applied Topics (Review), Journal of the University of Chemical Technology and Metallurgy (2007), vol. 42, No. 4, pp. 333-344.

Sloop et al., "The Role of Li-ion Battery Electrolyte Reactivity in Performance Decline and Self-Discharge", Journal of Power Sources (no month, 2003), vols. 119-121, pp. 330-337.

Shibata, Masami, et al., "Electrochemical Synthesis of Urea at Gas-Diffusion Electrodes", J. Electrochem. Soc., vol. 145, No. 2, Feb. 1998, pp. 595-600, The Electrochemical Society, Inc.

Shibata, Masami, et al., "Simultaneous Reduction of Carbon Dioxide and Nitrate Ions at Gas-Diffusion Electrodes with Various Metallophthalocyanine Catalysts", From a paper presented at the 4th International Conference on Electrocatalysis: From Theory to Industrial Applications', Sep. 22-25, 2002, Como, Italy, Electrochimica Acta 48 (2003) 3959-3958.

Harrison et al., "The Electrochemical Reduction of Organic Acids", Electroanalytical Chemistry and Interfacial Electrochemistry (no month, 1971), vol. 32, No. 1, pp. 125-135.

Chauhan et al., "Electro Reduction of Acetophenone in Pyridine on a D.M.E.", J Inst. Chemists (India) [Jul. 1983], vol. 55, No. 4, pp. 147-148.

Jitaru, Lowy, Toma, Toma and Oniciu, "Electrochemical Reduction of Carbon Dioxide on Flat Metallic Cathodes," Journal of Applied Electrochemistry, 1997, vol. 27, p. 876.

(56) References Cited

OTHER PUBLICATIONS

Popic, Avramov, and Vukovic, "Reduction of Carbon Dioxide on Ruthenium Oxide and Modified Ruthenium Oxide Electrodes in 0.5M NaHCO3," Journal of Electroanalytical Chemistry, 1997, vol. 421, pp. 105-110.
Eggins and McNeill, "Voltammetry of Carbon Dioxide. I. A General Survey of Voltammetry at Different Electrode Materials in Different Solvents," Journal of Electroanalytical Chemistry, 1983, vol. 148, pp. 17-24.
Kostecki and Augustynski, "Electrochemical Reduction of CO2 at an Active Silver Electrode," Ber. Busenges. Phys. Chem., 1994, vol. 98, pp. 1510-1515.
Non-Final Office Action for U.S. Appl. No. 12/846,221, dated Nov. 21, 2012.
Non-Final Office Action for U.S. Appl. No. 12/846,011, dated Aug. 29, 2012.
Non-Final Office Action for U.S. Appl. No. 12/846,002, dated Sep. 11, 2012.
Non-Final Office Action for U.S. Appl. No. 12/845,995, dated Aug. 13, 2012.
Final Office Action for U.S. Appl. No. 12/845,995, dated Nov. 28, 2012.
Non-Final Office Action for U.S. Appl. No. 12/696,840, dated Jul. 9, 2012.
Non-Final Office Action for U.S. Appl. No. 13/472,039, dated Sep. 13, 2012.
DNV (Det Norske Veritas), Carbon Dioxide Utilization, Electrochemical Conversion of CO2—Opportunities and Challenges, Research and Innovation, Position Paper, Jul. 2011.
Matthew R. Hudson, Electrochemical Reduction of Carbon Dioxide, Department of Chemistry, State University of New York at Potsdam, Potsdam New York 13676, pp. 1-15, Dec. 9, 2005.
Colin Oloman and Hui Li, Electrochemical Processing of Carbon Dioxide, ChemSusChem 2008, 1, 385-391, (c) 2008 Wiley-VCH Verlag GmbH& Co. KGaA, Weinheim, www.chemsuschem.org.
R.P.S. Chaplin and A.A. Wragg; Effects of Process Conditions and Electrode Material on Reaction Pathways for Carbon Dioxide Electroreduction with Particular Reference to Formate Formation; Journal of Applied Electrochemistry 33: pp. 1107-1123, 2003; © 2003 Kluwer Academic Publishers. Printed in the Netherlands.
Akahori, Iwanaga, Kato, Hamamoto, Ishii; New Electrochemical Process for CO2 Reduction to from Formic Acid from Combustion Flue Gases; Electrochemistry; vol. 4; pp. 266-270.
Ali, Sato, Mizukawa, Tsuge, Haga, Tanaka; Selective formation of HCO2- and C2O42- in electrochemical reduction of CO2 catalyzed by mono- and di-nuclear ruthenium complexes; Chemistry Communication; 1998; Received in Cambridge, UK, Oct. 13, 1997; 7/07363A; pp. 249-250.
Wang, Maeda, Thomas, Takanabe, Xin, Carlsson, Domen, Antonietti; A metal-free polymeric photocatalyst for hydrogen production from water under visible light; Nature Materials; Published Online Nov. 9, 2008; www.nature.com/naturematerials; pp. 1-5.
Aresta and Dibenedetto; Utilisation of CO2 as a Chemical Feedstock: Opportunities and Challenges; Dalton Transactions; 2007; pp. 2975-2992; © The Royal Society of Chemistry 2007.
B. Aurian-Blajeni, I. Taniguchi, and J. O'M. Bockris; Photoelectrochemical Reduction of Carbon Dioxide Using Polyaniline-Coated Silicon; J. Electroanal. Chem.; vol. 149; 1983; pp. 291-293; Elsevier Sequoia S.A., Lausanne, Printed in The Netherlands.
Azuma, Hashimoto, Hiramoto, Watanabe, Sakata; Electrochemical Reduction of Carbon Dioxide on Various Metal Electrodes in Low-Temperature Aqueous KHCO3 Media; J. Electrochem. Soc., vol. 137, No. 6, Jun. 1990 © The Electrochemical Society, Inc.
Bandi and Kuhne; Electrochemical Reduction of Carbon Dioxide in Water: Analysis of Reaction Mechanism on Ruthenium-Titanium-Oxide; J. Electrochem. Soc., vol. 139, No. 6, Jun. 1992 © The Electrochemical Society, Inc.
Beley, Collin, Sauvage, Petit, Chartier; Photoassisted Electro-Reduction of CO2 on p-GaAs In the Presence of Ni Cyclam; J. Electroanal. Chem. vol. 206, 1986, pp. 333-339, Elsevier Sequoia S.A., Lausanne, Printed in The Netherlands.
Benson, Kubiak, Sathrum, and Smieja; Electrocatalytic and homogeneous approaches to conversion of CO2 to liquid fuels; Chem. Soc. Rev., 2009, vol. 38, pp. 89-99, © The Royal Society of Chemistry 2009.
Taniguchi, Adrian-Blajeni, and Bockris; The Mediation of the Photoelectrochemical Reduction of Carbon Dioxide by Ammonium Ions; J. Electroanal. Chem., vol. 161, 1984, pp. 385-388, Elsevier Sequoia SA., Lausanne—Printed in The Netherlands.
Bockris and Wass; The Photoelectrocatalytic Reduction of Carbon Dioxide; J. Electrochem. Soc., vol. 136, No. 9, Sep. 1989, pp. 2521-2528, © The Electrochemical Society, Inc.
Carlos R. Cabrera and Hector D. Abruna; Electrocatalysis of CO2 Reduction at Surface Modified Metallic and Semiconducting Electrodes; J. Electroanal. Chem. vol. 209, 1986, pp. 101-107, Elesevier Sequoia S.A., Lausanne—Printed in The Netherlands, © 1986 Elsevier Sequoia S.A.
D. Canfield and K.W. Frese, Jr.; Reduction of Carbon Dioxide to Methanol on n- and p-GaAs and p-InP. Effect of Crystal Face, Electrolyte and Current Density; Journal of the Electrochemical Society; Aug. 1983; pp. 1772-1773.
Huang, Lu, Zhao, Li, and Wang; The Catalytic Role of N-Heterocyclic Carbene in a Metal-Free Conversion of Carbon Dioxide into Methanol: A Computational Mechanism Study; J. Am. Chem. Soc. 2010, vol. 132, pp. 12388-12396, © 2010 American Chemical Society.
Arakawa, et al., Catalysis Research of Relevance to Carbon Management: Progress, Challenges, and Opportunities; Chem. Rev. 2001, vol. 101, pp. 953-996.
Cheng, Blaine, Hill, and Mann; Electrochemical and IR Spectroelectrochemical Studies of the Electrocatalytic Reduction of Carbon Dioxide by [Ir2(dimen)4]2+ (dimen = 1,8-Diisocyanomenthane), Inorg. Chem. 1996, vol. 35, pp. 7704-7708, © 1996 American Chemical Society.
Stephen K. Ritter; What Can We Do With Carbon Dioxide?, Chemical & Engineering News, Apr. 30, 2007, vol. 85, No. 18, pp. 11-17, http://pubs.acs.org/cen/coverstory/85/8518cover.html.
J. Beck, R. Johnson, and T. Naya; Electrochemical Conversion of Carbon Dioxide to Hydrocarbon Fuels, EME 580 Spring 2010, pp. 1-42.
Aydin and Koleli, Electrochemical reduction of CO2 on a polyaniline electrode under ambient conditions and at high pressure in methanol, Journal of Electroanalytical Chemistry vol. 535 (2002) pp. 107-112, www.elsevier.com/locate/jelechem.
Lee, Kwon, Machunda, and Lee; Electrocatalytic Recycling of CO2 and Small Organic Molecules; Chem. Asian J. 2009, vol. 4, pp. 1516-1523, © 2009 Wiley-VCH Verlag GmbH&Co. KGaA, Weinheim.
Etsuko Fujita, Photochemical CO2 Reduction: Current Status and Future Prospects, American Chemical Society's New York Section, Jan. 15, 2011, pp. 1-29.
Toshio Tanaka, Molecular Orbital Studies on the Two-Electron Reduction of Carbon Dioxide to Give Formate Anion, Memoirs of Fukui University of Technology, vol. 23, Part 1, 1993, pp. 223-230.
A. Bewick and G.P. Greener, The Electroreduction of CO2 to Glycollate on a Lead Cathode, Tetrahedron Letters No. 5, pp. 391-394, 1970, Pergamon Press, Printed in Great Britain.
Centi, Perathoner, Wine, and Gangeri, Electrocatalytic conversion of CO2 to long carbon-chain hydrocarbons, Green Chem., 2007, vol. 9, pp. 671-678, © The Royal Society of Chemistry 2007.
A. Bewick and G.P. Greener, The Electroreduction of CO2 to Malate on a Mercury Cathode, Tetrahedron Letters No. 53, pp. 4623-4626, 1969, Pergamon Press, Printed in Great Britain.
Eggins, Brown, McNeill, and Grimshaw, Carbon Dioxide Fixation by Electrochemical Reduction in Water to Oxalate and Glyoxylate, Tetrahedron Letters vol. 29, No. 8, pp. 945-948, 1988, Pergamon Journals Ltd., Printed in Great Britain.
Hori, Kikuchi, and Suzuki; Production of CO and CH4 in Electrochemical Reduction of CO2 at Metal Electrodes in Aqueous

(56) References Cited

OTHER PUBLICATIONS

Hydrogencarbonate Solution; Chemistry Letters, pp. 1695-1698, 1985. (C) 1985 The Chemical Society of Japan.
Jitaru, Lowy, M. Toma, B.C. Toma, Oniciu; Electrochemical reduction of carbon dioxide on flat metallic cathodes; Journal of Applied Electrochemistry 27 (1997) pp. 875-889, Reviews in Applied Electrochemistry No. 45.
Kaneco, Iwao, Iiba, Itoh, Ohta, and Mizuno; Electrochemical Reduction of Carbon Dioxide on an Indium Wire In a KOH/Methanol-Based Electrolyte at Ambient Temperature and Pressure; Environmental Engineering Science; vol. 16, No. 2, 1999, pp. 131-138.
Todoroki, Hara, Kudo, and Sakata; Electrochemical reduction of high pressure CO2 at Pb, Hg and In electrodes in an aqueous KHCO3 solution; Journal of Electroanalytical Chemistry 394 (1995) 199-203.
R.P.S. Chaplin and A.A. Wragg, Effects of process conditions and electrode material on reaction pathways for carbon dioxide electroreduction with particular reference to formate formation, Journal of Applied Electrochemistry 33: 1107-1123, 2003, Copyright 2003 Kluwer Academic Publishers. Printed in the Netherlands.
Kapusta and Hackerman; The Electroreduction of Carbon Dioxide and Formic Acid on Tin and Indium Electrodes, J. Electrochem. Doc.: Electrochemical Science and Technology, vol. 130, No. 3 Mar. 1983, pp. 607-613.
M. N. Mahmood, D. Masheder, and C. J. Harty; Use of gas-diffusion electrodes for high-rate electrochemical reduction of carbon dioxide. I. Reduction at lead, indium- and tin-impregnated electrodes; Journal of Applied Electrochemistry 17 (1987) 1159-1170.
Yoshio Hori, Hidetoshi Wakebe, Toshio Tsukamoto and Osamu Koga; Electrocatalytic Process of CO Selectivity in Electrochemical Reductionof CO2 at Metal Electrodes in Aqueous Media; Electrochimica Acta, vol. 39, No. 11/12, pp. 1833-1839, 1994, Copyright 1994 Elsevier Science Ltd., Printed in Great Britain.
Noda, Ikeda, Oda, Imai, Maeda, and Ito; Electrochemical Reduction of Carbon Dioxide at Various Metal Electrodes in Aqueous Potassium Hydrogen Carbonate Solution; Bull. Chem. Soc. Jpn., 63, 2459-2462, 1990, Copyright 1990 The Chemical Society of Japan.
Azuma, Hashimoto, Hiramoto, Watanbe, and Sakata; Carbon dioxide reduction at low temperature on various metal electrodes; J. Electroanal. Chem., 260 (1989) 441-445, Elsevier Sequoia S.A., Lausanne—Printed in The Netherlands.
Vassiliev, Bagotzky, Khazova, and Mayorova; Electroreduction of Carbon Dioxide, Part II. The Mechanism Of Reduction in Aprotic Solvents, J. Electroanal. Chem. 189 (1985) 295-309, Elsevier Sequoia S.A., Lausanne—Printed in The Netherlands.
Vassiliev, Bagotzky, Khazova, and Mayorova; Electroreduction of Carbon Dioxide, Part I. The Mechanism and Kinetics of Electroreduction of CO2 in Aqueous Solutions on Metals with High and Moderate Hydrogen Overvoltages, J. Electroanal. Chem. 189 (1985) 271-294, Elsevier Sequoia S.A., Lausanne—Printed in The Netherlands.
Ikeda, Takagi, and Ito; Selective Formation of Formic Acid, Oxalic Acid, and Carbon Monoxide by Electrochemical Reduction of Carbon Dioxide, Bull. Chem. Soc. Jpn., 60, 2517-2522.
Shibata, Yoshida, and Furuya; Electrochemical Synthesis of Urea at Gas-Diffusion Electrodes, IV. Simultaneous Reduction of Carbon Dioxide and Nitrate Ions with Various Metal Catalysts; J. Electrochem. Soc., vol. 145, No. 7, Jul. 1998 The Electrochemical Society, Inc., pp. 2348-2353.
F. Richard Keene, Electrochemical and Electrocatalytic Reactions of Carbon Dioxide—Chapter 1: Thermodynamic, Kinetic, and Product Considerations in Carbon Dioxide Reactivity, Elsevier, Amsterdam, 1993, pp. 1-17.
Sammells and Cook, Electrochemical and Electrocatalytic Reactions of Carbon Dioxide—Chapter 7: Electrocatalysis and Novel Electrodes for High Rate CO2 Reduction Under Ambient Conditions, Elsevier, Amsterdam, 1993, pp. 217-262.
W.W. Frese, Jr., Electrochemical and Electrocatalytic Reactions of Carbon Dioxide—Chapter 6: Electrochemical Reduction of CO2 at Solid Electrodes, Elsevier, Amsterdam, 1993, pp. 145-215.

Halmann and Steinberg, Greenhouse gas carbon dioxide mitigation: science and technology—Chapter 11: Photochemical and Radiation-Induced Activation of CO2 in Homogeneous Media, CRC Press, 1999, pp. 391-410.
Halmann and Steinberg, Greenhouse gas carbon dioxide mitigation: science and technology—Chapter 12: Electrochemical Reduction of CO2, CRC Press, 1999, pp. 411-515.
Halmann and Steinberg, Greenhouse gas carbon dioxide mitigation: science and technology—Chapter 13: Photoelectrochemical Reduction of CO2, CRC Press, 1999, pp. 517-527.
Colin Oloman and Hui Li, Electrochemical Processing of Carbon Dioxide, ChemSusChem 2008, 1, 385-391, Copyright 2008 Wiley-VCH Verlag GmbH& Co. KGaA, Weinheim, www.chemsuschem. org.
Hui Li and Colin Oloman, Development of a continuous reactor for the electro-reduction of carbon dioxide to formate—Part 1: Process variables, Journal of Applied Electrochemistry (2006) 36:1105-1115, Copyright Springer 2006.
Hui Li and Colin Oloman, Development of a continuous reactor for the electro-reduction of carbon dioxide to formate—Part 2: Scale-up, J Appl Electrochem (2007) 37:1107-1117.
Hui Li and Colin Oloman, The electro-reduction of carbon dioxide in a continuous reactor, Journal of Applied Electrochemistry (2005) 35:955-965, Copyright Springer 2005.
PCT International Search Report dated Dec. 13, 2011, PCT/US11/45515, 2 pages.
Andrew P. Doherty, Electrochemical reduction of butraldehyde in the presence of CO2, Electrochimica Acta 47 (2002) 2963-2967, Copyright 2002 Elsevier Science Ltd.
PCT International Search Report dated Dec. 15, 2011, PCT/US11/45521, 2 pages.
Fan et al., Semiconductor Electrodes. 27. The p- and n-GaAs—N, N?—Dimet h yl-4,4'- bipyridinium System. Enhancement of Hydrogen Evolution on p-GaAs and Stabilization of n-GaAs Electrodes, Journal of the American Chemical Society, vol. 102, Feb. 27, 1980, pp. 1488-1492.
PCT International Search Report dated Jun. 23, 2010, PCT/US10/22594, 2 pages.
Emily Barton Cole and Andrew B. Bocarsly, Carbon Dioxide as Chemical Feedstock, Chapter 11—Photochemical, Electrochemical, and Photoelectrochemical Reduction of Carbon Dioxide, Copyright 2010 Wiley-VCH Verlag GmbH & Co. KGaA, Weinheim, 26 pages.
Barton Cole, Lakkaraju, Rampulla, Morris, Abelev, and Bocarsly; Using a One-Electron Shuttle for the Multielectron Reduction of CO2 to Methanol: Kinetic, Mechanistic, and Structural Insights; Mar. 29, 2010, 13 pages.
Morris, McGibbon, and Bocarsly; Electrocatalytic Carbon Dioxide Activation: The Rate-Determining Step of Pyridinium-Catalyzed CO2 Reduction; ChemSusChem 2011, 4, 191-196, Copyright 2011 Wiley-VCH Verlag GmbH& Co. KGaA, Weinheim.
Emily Barton Cole, Pyridinium-Catalyzed Electrochemical and Photoelectrochemical Conversion of CO2 to Fuels: A Dissertation Presented to the Faculty of Princeton University in Candidacy for the Degree of Doctor of Philosophy, Nov. 2009, pp. 1-141.
Barton, Rampulla, and Bocarsly; Selective Solar-Driven Reduction of CO2 to Methanol Using a Catalyzed p-GaP Based Photoelectrochemical Cell; Oct. 3, 2007, 3 pages.
Mostafa Hossain, Nagaoka, and Ogura; Palladium and cobalt complexes of substituted quinoline, bipyridine and phenanthroline as catalysts for electrochemical reduction of carbon dioxide; Electrochimica Acta, vol. 42, No. 16, pp. 2577-2585, 1997.
Keene, Creutz, and Sutin; Reduction of Carbon Dioxide by Tris(2,2' -Bipyridine)Cobalt(I), Coordination Chemistry Reviews, 64 (1995) 247-260, Elsevier Science Publishers B.V., Amsterdam—Printed in The Netherlands.
Aurian-Blajeni, Halmann, and Manassen; Electrochemical Measurements on the Photoelectrochemical Reduction of Aqueous Carbon Dioxide on p-Gallium Phosphide and p-Gallium Arsenide Semiconductor Electrodes, Solar Energy Materials 8 (1983) 425-440, North-Holland Publishing Company.
Tan, Zou, and Hu; Photocatalytic reduction of carbon dioxide into gaseous hydrocarbon using TiO2 pellets; Catalysis Today 115 (2006) 269-273.

(56) References Cited

OTHER PUBLICATIONS

Bandi and Kuhne, Electrochemical Reduction of Carbon Dioxide in Water: Analysis of Reaction Mechanism on Ruthenium-Titanium-Oxide, J. Electrochem. Soc., vol. 139, No. 6, Jun. 1992 (C) The Electrochemical Society, Inc., pp. 1605-1610.

B. Beden, A. Bewick and C. Lamy, A Study by Electrochemically Modulated Infrared Reflectance Spectroscopy of the Electrosorption of Formic Acid at a Platinum Electrode, J. Electroanal. Chem., 148 (1983) 147-160, Elsevier Sequoia S.A., Lausanne—Printed in The Netherlands.

Bell and Evans, Kinetics of the Dehydration of Methylene Glycol in Aqueous Solution, Proceedings of the Royal Society of London, Series A, Mathematical and Physical Sciences, vol. 291, No. 1426 (Apr. 26, 1966), pp. 297-323.

Bian, Sumi, Furue, Sato, Kolke, and Ishitani; A Novel Tripodal Ligand, Tris[(4'-methyl-2,2'-bipyridyl-4-yl)-methyl]carbinol and Its Trinuclear RuII/ReI Mixed-Metal Complexes: Synthesis, Emission Properties, and Photocatalytic CO2 Reduction; Inorganic Chemistry, vol. 47, No. 23, 2008, pp. 10801-10803.

T. Bundgaard, H. J. Jakobsen, and E. J. Rahkamaa; A High-Resolution Investigation of Proton Coupled and Decoupled 13C FT NMR Spectra of 15N-Pyrrole; Journal of Magnetic Resonance 19,345-356 (1975).

D. Canfield and K. W. Frese, Jr, Reduction of Carbon Dioxide to Methanol on n- and p-GaAs and p-InP. Effect of Crystal Face, Electrolyte and Current Density, Journal of the Electrochemical Society, vol. 130, No. 8, Aug. 1983, pp. 1772-1773.

Arakawa, et al., Catalysis Research of Relevance to Carbon Management: Progress, Challenges, and Opportunities, Chem. Rev. 2001, 101, 953-996.

Chang, Ho, and Weaver; Applications of real-time infrared spectroscopy to electrocatalysis at bimetallic surfaces, I. Electrooxidation of formic acid and methanol on bismuth-modified Pt(111) and Pt(100), Surface Science 265 (1992) 81-94.

S. Clarke and J. A. Harrison, The Reduction of Formaldehyde, Electroanalytical Chemistry and Interfacial Electrochemistry, J. Electroanal. Chem., 36 (1972), pp. 109-115, Elsevier Sequoia S.A., Lausanne Printed in The Netherlands.

Li, Markley, Mohan, Rodriguez-Santiago, Thompson, and Van Niekerk; Utilization of Carbon Dioxide From Coal-Fired Power Plant for the Production of Value-Added Products; Apr. 27, 2006, 109 pages.

Seshardi G., Lin C., Bocarsly A.B., A new homogeneous electrocatalyst for the reduction of carbon dioxide to methanol at low overpotential, Journal of Electroanalytical Chemistry, 1994, 372, pp. 145-150.

Seshadri et al., A New Homogeneous Electrocatalyst for the Reduction of Carbon Dioxide to Methanol at Low Overpotential, Journal of Electroanalytical Chemistry, 372 (1994), 145-50.

Green et al., Vapor-Liquid Equilibria of Formaldehyde-Methanol-Water, Industrial and Engineering Chemistry (Jan. 1955), vol. 47, No. 1, pp. 103-109.

Scibioh et al., Electrochemical Reduction of Carbon Dioxide: A Status Report, Proc Indian Natn Sci Acad (May 2004), vol. 70, A, No. 3, pp. 407-462.

Gennaro et al., Homogeneous Electron Transfer Catalysis of the Electrochemical Reduction of Carbon Dioxide. Do Aromatic Anion Radicals React in an Outer-Sphere Manner?, J. Am. Chem. Soc. (no month, 1996), vol. 118, pp. 7190-7196.

Perez et al., Activation of Carbon Dioxide by Bicyclic Amidines, J. Org. Chem. (no month, 2004), vol. 69, pp. 8005-8011.

Zaragoza Dorwald, Side Reactions in Organic Synthesis, 2005, Wiley-VCH Verlag GmbH & Co. KGaA, Weinheim, Preface. p. IX.

Liansheng et al, Journal of South Central University Technology, Electrode Selection of Electrolysis with Membrane for Sodium Tungstate Solution, 1999, 6(2), pp. 107-110.

Mahmood et al., Use of Gas-Diffusion Electrodes for High-Rate Electrochemical Reduction of Carbon Dioxide. II. Reduction at Metal Phthalocyanine-Impregnated Electrodes, J. of Appl. Electrochem. (no month, 1987), vol. 17, pp. 1223-1227.

Tanno et al., Electrolysis of Iodine Solution in a New Sodium Bicarbonate-Iodine Hybrid Cycle, International Journal of Hydrogen Energy (no month, 1984), vol. 9, No. 10, pp. 841-848.

Shibata et al., "Electrochemical Synthesis of Urea at Gas-Diffusion Electrodes Part VI. Simultaneous Reduction of Carbon Dioxide and Nitrite Ions with Various Metallophthalocyanine Catalysts". J. of Electroanalytical Chemistry (no month, 2001), vol. 507, pp. 177-184.

Jaaskelainen and Haukka, The Use of Carbon Dioxide in Ruthenium Carbonyl Catalyzed 1-hexene Hydroformylation Promoted by Alkali Metal and Alkaline Earth Salts, Applied Catalysis A: General, 247, 95-100 (2003).

Heldebrant et al., "Reversible Zwitterionic Liquids, The Reaction of Alkanol Guanidines, Alkanol Amidines, and Diamines wih CO2", Green Chem. (mo month, 2010), vol. 12, pp. 713-721.

Perez et al., "Activation of Carbon Dioxide by Bicyclic Amidines", J. Org. Chem. (no month, 2004), vol. 69, pp. 8005-8011.

Seshadri et al., "A new homogeneous electrocatalyst for the reduction of carbon dioxide to methanol at low overpotential", Journal of Electroanalytical Chemistry and Interfacial Electro Chemistry, Elsevier, Amsterdam, NL, vol. 372, No. 1-2, Jul. 8, 1994, pp. 145-150.

Hossain et al., "Palladium and cobalt complexes of substituted quinoline, bipyridine and phenanthroline as catalysts for electrochemical reduction of carbon dioxide", Electrochimica Acta, Elsevier Science Publishers, vol. 42, No. 16, Jan. 1, 1997, pp. 2577-2585.

Fisher et al., "Electrocatalytic reduction of carbon dioxide by using macrocycles of nickel and cobalt", Journal of the American Chemical Society, vol. 102, No. 24, Sep. 1, 1980, pp. 7361-7363.

Ishida et al., Selective Formation of HC00—In the Electrochemical CO2 Reduction Catalyzed by URU(BPY)2(CO)2 3/4 2+ (BPY = 2,2 '-Bipyridine), Journal of the Chemical Society, Chemical Communications, Chemical Society, Letchworth, GB, Jan. 1, 1987, pp. 131-132.

Zhao et al., "Electrochemical reduction of supercritical carbon dioxide in ionic liquid 1-n-butyl-3-methylimidazolium hexafluorophosphate", Journal of Supercritical Fluids, PRA Press, US, vol. 32, No. 1-3, Dec. 1, 2004, pp. 287-291.

Hori et al, chapter on "Electrochemical CO2 Reduction on Metal Electrodes," in the book "Modern Aspects of Electrochemistry," vol. 42, pp. 106 and 107.

Hossain et al., Palladium and Cobalt Complexes of Substituted Quinoline, Bipyridine and Phenanthroline as Catalysts for Electrochemical Reduction of Carbon Dioxide, Electrochimica Acta (no month, 1997), vol. 42, No. 16, pp. 2577-2785.

Scibioh et al., "Electrochemical Reduction of Carbon Dioxide: A Status Report", Proc Indian Natn Sci Acad (May 2004), vol. 70, A, No. 3, pp. 407-462.

Scibioh et al, "Electrochemical Reductin of Carbon Dioxide: A Status Report," Proc. Indian Natn Science Acad., 70, A, No. 3, May 2004, pp. 407-762.

Fukaya et al., "Electrochemical Reduction of Carbon Dioxide to Formate Catalyzed by Rh(bpy)3CI3", Kagaku Gijutsu Kenkyusho Hokoku (no month, 1986), vol. 81, No. 5, pp. 255-258. 1-page abstract only.

Li et al., "The Electro-Reduction of Carbon Dioxide in a Continuous Reactor", J. of Applied Electrochemistry (no month, 2005), vol. 35, pp. 955-965.

Kaneco et al., "Electrochemical Reduction of Carbon Dioxide to Ethylene with High Faradaic Efficiency at a Cu Electrode in CsOH/Methanol", Electrochimica Acta (no month, 1999), vol. 44, pp. 4701-4706.

Yuan et al., "Electrochemical Activation of Carbon Dioxide for Synthesis of Dimethyl Carbonate in an Ionic Liquid", Electrochimica Acta (no month, 2009), vol. 54, pp. 2912-2915.

U.S. Appl. No. 13/724,647, filed Dec. 21, 2012; Office Action mailed Oct. 17, 2013.

U.S. Appl. No. 13/787,481, filed Mar. 6, 2013; Office Action mailed Sep. 13, 2013.

U.S. Appl. No. 13/724,082, filed Dec. 21, 2012; Office Action mailed Aug. 12, 2013.

U.S. Appl. No. 13/724,522, filed Dec. 21, 2012; Office Action mailed Oct. 1, 2013.

(56) References Cited

OTHER PUBLICATIONS

U.S. Appl. No. 13/724,885, filed Dec. 21, 2012; Office Action mailed Aug. 21, 2013.
U.S. Appl. No. 13/724,231, filed Dec. 21, 2012; Office Action mailed Aug. 20, 2013.
Scibioh et al, "Electrochemical Reduction of Carbon Dioxide: A Status Report," Proc. Indian Natn Science Acad., 70, A, No. 3, May 2004, pp. 407-762.
Hossain et al, "Palladium and Cobalt Complexes of Substituted Quinoline, Bipyridine and Phenanthroline as Catalysts for Electrochemical Reduction of Carbon Dioxide," Electrochimica Acta, vol. 42, No. 16 (1997), pp. 2577-2585.
Fischer, "Liquid Fuels from Water Gas", Industrial and Engineering Chemistry, vol. 17, No. 6, Jun. 1925, pp. 574-576.
Williamson et al, "Rate of Absorption and Equilibrium of Carbon Dioxide in Alkaline Solutions", Industrial and Engineering Chemistry, vol. 16, No. 11, Nov. 1924, pp. 1157-1161.
Hori, "Electrochemical CO2 Reduction on Metal Electrodes", Modern Aspects of Electrochemistry, No. 42, 2008, pp. 89-189.
James Grimshaw, Electrochemical Reactions and Mechanisms in Organic Chemistry, 2000, ISBN 978-0-444-72007-8. [retrieved on Jan. 3, 2014]. Retrieved from the internet. <URL: http://f3.tiera.ru/ShiZ/Great%20Science%20TextBooks/Great%Science%20Textbooks%20DVD%20Library%202007%20-%20Supplement%20Five/Chemistry/Organic%20Chemistry/Electrochemical%20Reactions%20and%20Mechanisms%20in-%20Organic%20Chemistry%20-%20J.%20Grimshaw%20%28Elsevier,%202000%29%WW.pdf>.
Fischer, J. et al. "The production of oxalic acid from CO2 and H2O." Journal of Applied Electrochemistry, 1981, vol. 11, pp. 743-750.
Goodridge, F. et al., The electrolytic reduction of carbon dioxide and monoxide for the production of carboxylic acids.: Journal of applied electrochemistry, 1984, vol. 14, pp. 791-796.
Chen et al., "Tin oxide dependence of the CO2 reduction efficiency on tin electrodes and enhanced activity for tin/tin oxide thin-film catalysts." Journal of the American Chemical Society 134, No. 4 (2012): 1986-1989, Jan. 9, 2012, retrieved on-line.
Zhou et al. "Anodic passivation processes of indium in alkaline solution [J]" Journal of Chinese Society for Corrosion and Protection 1 (2005): 005, Feb. 2005.
Fukaya et al., "Electrochemical Reduction of Carbon Dioxide to Formate Catalyzed by Rh(bpy)3Cl3", Kagaku Gijutsu Kenkyusho Hokoku (no month, 1986), vol. 81, No. 5, pp. 255-258.
Kaneco et al., "Electrochemical Conversion of Carbon Dioxide to Formic Acid on Pb in KOH/Methanol Electrolyte at Ambient Temperature and Pressure", Energy (no month, 1998), vol. 23, No. 12, pp. 1107-1112.
Wu et al., "Electrochemical Reduction of Carbon Dioxide I. Effects of the Electrolyte on the Selectivity and Activity with Sn Electrode", Journal of the Electrochemical Society (no month, 2012), vol. 159, No. 7, pp. F353-F359.
Chaplin et al., "Effects of Process Conditions and Electrode Material on Reaction Pathways for Carbon Dioxide Electroreduction with Particular Reference to Formate Formation", Journal of Applied Electrochemistry (no month, 2003), vol. 33, pp. 1107-1123.
Jaime-Ferrer et al., "Three-Compartment Bipolar Membrane Electrodialysis for Splitting of Sodium Formate into Formic Acid and Sodium Hydroxide: Role of Diffusion of Molecular Acid", Journal of Membrane Science (no month, 2008), vol. 325, pp. 528-536.

* cited by examiner

| PRODUCT | SYSTEM | CATALYST CONCENTRATION | ELECTROLYTE CONCENTRATION | CATHODE POTENTIAL | pH |
|---|---|---|---|---|---|
| CARBON MONOXIDE | Sn/PYRIDINE/KCl QUINOLINE ALSO EFFECTIVE | 10 TO 100mM | 0.25 TO 1M | -1 TO -1.4 | 5-7 |
| CARBONATE | STEEL/IMIDAZOLE/KCl WITH $CaCl_2$ | 10 TO 100mM | 0.5M KCl W/ 0.1M $CaCl_2$ | -0.9 TO -1.2 | 4-7 |
| FORMIC ACID | Sn/IMIDAZOLE/KCl OR STAINLESS STEEL/ IMIDAZOLE/CsCl SUBSTITUTED IMIDAZOLES, THIAZOLES, AND ADENINE ALSO EFFECTIVE | 10 TO 100mM | 0.25 TO 1M | -0.8 TO -1.4 | 4-8 |
| FORMALDEHYDE | ELGILOY/PYRIDINE/$Na_2SO_4$ | 10mM TO 100mM | 0.25 TO 1M | -0.8 TO -1.2 | 4-7 |
| METHANOL | Mo/PYRIDINE/ $Na_2SO_4$ | 10mM TO 100mM | 0.25 TO 1M | -0.8 TO -1.2 | 4-7 |
| OXALIC ACID | FERRITIC STEEL/ IMIDAZOLE/$CaCl_2$ | 10mM TO 100mM | 0.25 TO 1M | -0.8 TO -1.2 | 5-7 |
| GLYOXYLIC ACID | FERRITIC STEEL/ IMIDAZOLE/KCl | 10mM TO 100mM | 0.25 TO 1M | -0.8 TO -1.2 | 5-7 |
| GLYOXAL | Co/PYRIDINE/KCl | 10mM TO 100mM | 0.25 TO 1M | -0.8 TO -1.2 | 5-7 |
| ACETALDEHYDE | Ni ALLOYS/ PYRIDINE/ $Na_2SO_4$ | 10mM TO 100mM | 0.25 TO 1M | -0.8 TO -1.2 | 4-7 |
| ETHANOL | DUPLEX STEEL/ IMIDAZOLE/KCl | 50mM TO 300mM | 0.25 TO 1M | -0.8 TO -1 | 4-6 |
| ACETONE | DUPLEX STEEL/ PYRIDINE/KCl | 10mM TO 100mM | 0.25 TO 1M | -0.8 TO -1 | 4-6 |
| ISOPROPANOL | DUPLEX STEEL/ PYRIDINE/KCl, STAINLESS STEEL/ METHYLIMIDAZOLE/KCl, STAINLESS STEEL/ 2,2' BIPYRIDINE/KCl | 10mM TO 100mM | 0.25 TO 1M | -0.8 TO -1.2 | 4-8 |
| POLYMERS | P-Si:As/PYRIDINE/$Na_2SO_4$ | 10mM TO 100mM | 0.25 TO 1M | -1.6 TO -2 | 4-8 |

FIG. 2A

CATHODE-ELECTROLYTE COMBINATIONS
(WITH 10mM PYRIDINE CATALYST)

| CATHODE MATERIAL | ELECTROLYTE | REL YIELD ORGANICS |
|---|---|---|
| TIN (Sn) | $Na_2SO_4$ | 81% METHANOL, 19% FORMIC ACID |
| MOLYBDENUM (Mo) | KCl OR $Na_2SO_4$ | 100% METHANOL |
| COBALT (Co) | KCl | 36% METHANOL, 74% FORMIC ACID |
| NICKEL (Ni) | KCl | 50% METHANOL, 50% FORMIC ACID |
| CHROMIUM (Cr) | KCl | 100% ACETONE |
| VANADIUM (V) | KCl | 100% METHANOL |
| NIOBIUM (Nb) | KCl | 100% FORMIC ACID |
| TUNGSTEN (W) | KCl | 100% ACETONE |
| SILVER (Ag) | $Na_2SO_4$ | 54% METHANOL, 46% ACETONE |
| STAINLESS STEEL 304 | $Na_2SO_4$ | 100% METHANOL |
| STAINLESS STEEL 316 | $Na_2SO_4$ | 100% METHANOL |
| STAINLESS STEEL 316 | KCl | 100% FORMIC ACID |
| STAINLESS STEEL 430 | KCl | X% GLYOXAL, Y% FORMIC ACID |
| STAINLESS STEEL 2205 | $Na_2SO_4$ | 100% METHANOL |
| STAINLESS STEEL 2205 | KCl | UP TO 99% ACETONE, 1% FORMIC ACID |
| NICHROME (80% Ni, 20% Cr) | KCl | 100% ACETONE |
| Ni-Fe (45% Ni, 55% Fe) | $Na_2SO_4$ | 100% METHANOL |
| NICKEL 625 (INCONEL) | $Na_2SO_4$ | 100% METHANOL |
| NICKEL 625 (INCONEL) | KCl | 99% ACETONE, 1% FORMIC ACID |

FIG. 2B

CATHODE-ELECTROLYTE COMBINATIONS
(WITH 10mM PYRIDINE CATALYST)

| CATHODE MATERIAL | ELECTROLYTE | REL YIELD ORGANICS |
|---|---|---|
| NICKEL 600 | KCl | 55% METHANOL, 45% FORMIC ACID |
| NICKEL HX | $Na_2SO_4$ | X% GLYOXAL, Y% METHANOL |
| NICKEL HX | KCl | 100% FORMIC ACID |
| ELGILOY (Co, Ni, Cr) | $Na_2SO_4$ | 89% METHANOL, 11% FORMIC ACID |
| ELGILOY (Co, Ni, Cr) | KCl | 95% ACETONE, 5% FORMIC ACID |
| BRASS 464 (39% Zn) | $Na_2SO_4$ | 81% METHANOL, 19% FORMIC ACID |
| BRONZE 510 (5% Sn) | $Na_2SO_4$ | 100% METHANOL |
| Cu-Mn-Ni | KCl | 100% ACETONE |
| Cu-Ni | KCl | 100% ACETONE |
| BRASS 260 | KCl | 100% ACETONE |

REDUCING CARBON DIOXIDE TO PRODUCTS

CROSS REFERENCE TO RELATED APPLICATIONS

This application claims priority to U.S. Provisional Application Ser. No. 61/609,088, filed Mar. 9, 2012, to U.S. Provisional Application Ser. No. 61/607,240, filed Mar. 6, 2012, and to U.S. application Ser. No. 12/846,221, filed Jul. 29, 2010, which are hereby incorporated by reference in their entireties.

The present application incorporates by reference co-pending U.S. patent application Ser. No. 13/787,481, entitled REDUCING CARBON DIOXIDE TO PRODUCTS, in its entirety.

GOVERNMENT INTERESTS

This invention was made with government support under Grant DE-SC0006201 awarded by the Department of Energy. The government has certain rights in the invention.

FIELD

The present invention relates to chemical reduction generally and, more particularly, to a method and/or apparatus for implementing reducing carbon dioxide to products.

BACKGROUND

The combustion of fossil fuels in activities such as the electricity generation, transportation, and manufacturing produces billions of tons of carbon dioxide annually. Research since the 1970s indicates increasing concentrations of carbon dioxide in the atmosphere may be responsible for altering the Earth's climate, changing the pH of the ocean and other potentially damaging effects. Countries around the world, including the United States, are seeking ways to mitigate emissions of carbon dioxide.

A mechanism for mitigating emissions is to convert carbon dioxide into economically valuable materials such as fuels and industrial chemicals. If the carbon dioxide is converted using energy from renewable sources, both mitigation of carbon dioxide emissions and conversion of renewable energy into a chemical form that can be stored for later use will be possible. Electrochemical and photochemical pathways are means for the carbon dioxide conversion.

SUMMARY OF THE PREFERRED EMBODIMENTS

The present disclosure concerns methods for reducing carbon dioxide to one or more products. The methods may include steps (A) to (C). Step (A) may bubble the carbon dioxide into a solution of an electrolyte and a catalyst in a divided electrochemical cell. The divided electrochemical cell may include an anode in a first cell compartment and a cathode in a second cell compartment. The cathode generally reduces the carbon dioxide into the products. Step (B) may adjust one or more of (a) a cathode material, (b) a surface morphology of said cathode, (c) said electrolyte, (d) a manner in which said carbon dioxide is bubbled, (e), a pH level of said solution, and (f) an electrical potential of said divided electrochemical cell, to vary at least one of (i) which of said products is produced and (ii) a faradaic yield of said products. Step (C) may separate the products from the solution.

The present disclosure concerns a system for electrochemical reduction of carbon dioxide. The system may include an electrochemical cell, which may include a first cell compartment, an anode positioned within said first cell compartment, a second cell compartment, a separator interposed between said first cell compartment and said second cell compartment. The second cell compartment may contain an electrolyte. The electrochemical cell may include a cathode within said second cell compartment. The cathode may be selected from the group consisting of n-GaAs, SS304, n-Ge, $NiCo_2O_4$, Rh, and mixtures thereof. The system may also include an energy source operably coupled with said anode and said cathode. The energy source may be configured to apply a voltage between said anode and said cathode to reduce carbon dioxide at said cathode to at least one of acetate, acetic acid, glycolate, and glycolic acid.

BRIEF DESCRIPTION OF THE DRAWINGS

These and other objects, features and advantages of the present invention will be apparent from the following detailed description and the appended claims and drawings in which:

FIGS. 2A-2C are tables illustrating relative product yields for different cathode material, catalyst, electrolyte and pH level combinations;

DETAILED DESCRIPTION OF THE PREFERRED EMBODIMENTS

Figure 1:
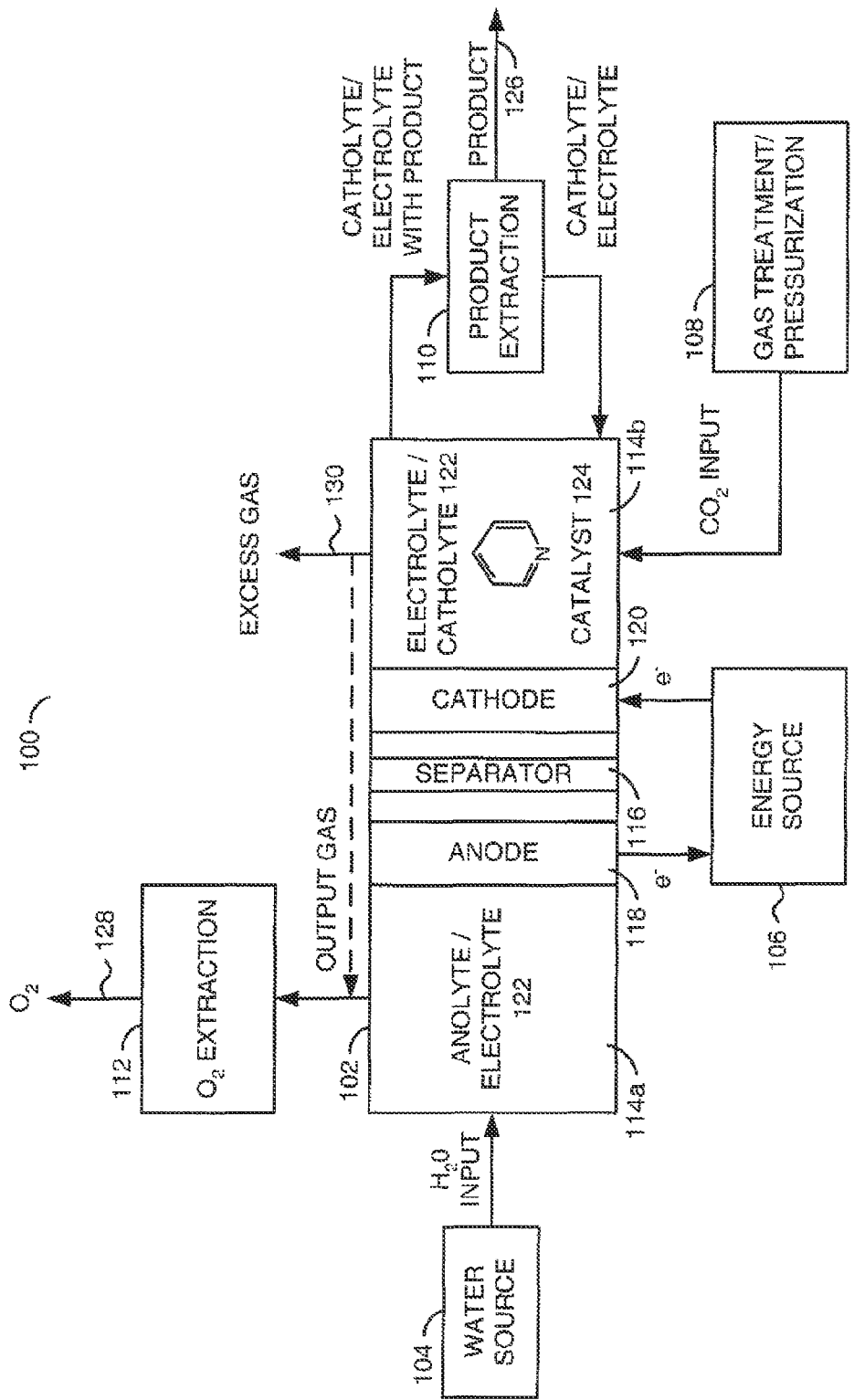
FIG. 1 is a block diagram of a system in accordance with a preferred embodiment of the present invention.

In accordance with some embodiments of the present invention, an electro-catalytic system is provided that generally allows carbon dioxide to be converted at modest overpotentials to highly reduced species in an aqueous solution. Some embodiments generally relate to simple, efficient and economical conversion of carbon dioxide to reduced organic products, such as methanol, formic acid and formaldehyde. Inorganic products such as polymers may also be formed. Carbon-carbon bonds and/or carbon-hydrogen bonds may be formed in the aqueous solution under mild conditions utilizing a minimum of energy. In some embodiments, the energy used by the system may be generated from an alternative energy source or directly using visible light, depending on how the system is implemented.

The reduction of carbon dioxide may be suitably catalyzed by aromatic heterocyclic amines (e.g., pyridine, imidazole and substituted derivatives). Simple organic compounds have been found to be effective and stable homogeneous electrocatalysts and photoelectrocatalysts for the aqueous multiple electron, multiple proton reduction of carbon dioxide to organic products, such as formic acid, formaldehyde and methanol. For production of methanol, the reduction of carbon dioxide may proceed along an electron (e−) transfer pathway. High faradaic yields for the reduced products have generally been found in both electrochemical and photoelectrochemical systems at low reaction overpotentials.

Metal-derived multi-electron transfer was previously thought to achieve highly reduced products such as methanol. Currently, simple aromatic heterocyclic amine molecules may be capable of producing many different chemical species on route to methanol through multiple electron transfers, instead of metal-based multi-electron transfers.

Some embodiments of the present invention thus relate to environmentally beneficial methods for reducing carbon dioxide. The methods generally include electrochemically and/or photoelectrochemically reducing the carbon dioxide in an aqueous, electrolyte-supported divided electrochemical cell that includes an anode (e.g., an inert conductive counter electrode) in a cell compartment and a conductive or p-type semiconductor working cathode electrode in another cell compartment. A catalyst may be included to produce a reduced product. Carbon dioxide may be continuously bubbled through the cathode electrolyte solution to saturate the solution.

For electrochemical reductions, the electrode may be a suitable conductive electrode, such as Al, Au, Ag, Bi, C, Cd, Co, Cr, Cu, Cu alloys (e.g., brass and bronze), Ga, Hg, In, Mo, Nb, Ni, NiCo$_2$O$_4$, Ni alloys (e.g., Ni 625, NiHX), Ni—Fe alloys, Pb, Pd alloys (e.g., PdAg), Pt, Pt alloys (e.g., PtRh), Rh, Sn, Sn alloys (e.g., SnAg, SnPb, SnSb), Ti, V, W, Zn, stainless steel (SS) (e.g., SS 2205, SS 304, SS 316, SS 321), austenitic steel, ferritic steel, duplex steel, martensitic steel, Nichrome (e.g., NiCr 60:16 (with Fe)), elgiloy (e.g., Co—Ni—Cr), degenerately doped p-Si, degenerately doped p-Si:As, degenerately doped p-Si:B, degenerately doped n-Si, degenerately doped n-Si:As, and degenerately doped n-Si:B. Other conductive electrodes may be implemented to meet the criteria of a particular application. For photoelectrochemical reductions, the electrode may be a p-type semiconductor, such as p-GaAs, p-GaP, p-InN, p-InP, p-CdTe, p-GaInP$_2$ and p-Si, or an n-type semiconductor, such as n-GaAs, n-GaP, n-InN, n-InP, n-CdTe, n-GaInP$_2$ and n-Si. Other semiconductor electrodes may be implemented to meet the criteria of a particular application including, but not limited to, CoS, MoS$_2$, TiB, WS$_2$, SnS, Ag$_2$S, CoP$_2$, Fe$_3$P, Mn$_3$P$_2$, MoP, Ni$_2$Si, MoSi$_2$, WSi$_2$, CoSi$_2$, TiO$_7$, SnO$_2$, GaAs, GaSb, Ge, and CdSe.

The catalyst for conversion of carbon dioxide electrochemically or photoelectrochemically may be a substituted or unsubstituted aromatic heterocyclic amine. Suitable amines are generally heterocycles which may include, but are not limited to, heterocyclic compounds that are 5-member or 6-member rings with at least one ring nitrogen. For example, pyridines, imidazoles and related species with at least one five-member ring, bipyridines (e.g., two connected pyridines) and substituted derivatives were generally found suitable as catalysts for the electrochemical reduction and/or the photoelectrochemical reduction. Amines that have sulfur or oxygen in the rings may also be suitable for the reductions. Amines with sulfur or oxygen may include thiazoles or oxazoles. Other aromatic amines (e.g., quinolines, adenine, azoles, indoles, benzimidazole and 1,10-phenanthroline) may also be effective electrocatalysts.

Carbon dioxide may be photochemically or electrochemically reduced to formic acid with formaldehyde and methanol being formed in smaller amounts. Catalytic hydrogenation of carbon dioxide using heterogeneous catalysts generally provides methanol together with water as well as formic acid and formaldehyde. The reduction of carbon dioxide to methanol with complex metal hydrides, such as lithium aluminum hydrides, may be costly and therefore problematic for bulk production of methanol. Current reduction processes are generally highly energy-consuming and thus are not efficient ways for a high yield, economical conversion of carbon dioxide to various products.

On the other hand, the use of processes for converting carbon dioxide to reduced organic and/or inorganic products in accordance with some embodiments of the invention generally has the potential to lead to a significant reduction of carbon dioxide, a major greenhouse gas, in the atmosphere and thus to the mitigation of global warming. Moreover, some embodiments may advantageously produce methanol and related products without adding extra reactants, such as a hydrogen source. The resultant product mixture may use little in the way of further treatment. For example, a resultant 1 molar (M) methanol solution may be used directly in a fuel cell. For other uses, simple removal of the electrolyte salt and water may be readily accomplished.

Before any embodiments of the invention are explained in detail, it is to be understood that the embodiments may not be limited in application per the details of the structure or the function as set forth in the following descriptions or illustrated in the figures of the drawing. Different embodiments may be capable of being practiced or carried out in various ways. Also, it is to be understood that the phraseology and terminology used herein is for the purpose of description and should not be regarded as limiting. The use of terms such as "including," "comprising," or "having" and variations thereof herein are generally meant to encompass the item listed thereafter and equivalents thereof as well as additional items.

Further, unless otherwise noted, technical terms may be used according to conventional usage.

In the following description of methods, process steps may be carried out over a range of temperatures (e.g., approximately 10° C. (Celsius) to 50° C.) and a range of pressures (e.g., approximately 1 to 10 atmospheres) unless otherwise specified. Numerical ranges recited herein generally include all values from the lower value to the upper value (e.g., all possible combinations of numerical values between the lowest value and the highest value enumerated are considered expressly stated). For example, if a concentration range or beneficial effect range is stated as 1% to 50%, it is intended that values such as 2% to 40%, 10% to 30%, or 1% to 3%, etc., are expressly enumerated. The above may be simple examples of what is specifically intended.

A use of electrochemical or photoelectrochemical reduction of carbon dioxide, tailored with certain electrocatalysts, may produce methanol and related products in a high yield of about 60% to about 100%, based on the amount of carbon dioxide, suitably about 75% to 90%, and more suitably about 85% to 95%. At an electric potential of about −0.50 to −2 volts (V) with respect to a saturated calomel electrode (SCE), methanol may be produced with good faradaic efficiency at the cathode.

An example of an overall reaction for the reduction of carbon dioxide may be represented as follows:

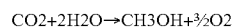
CO2+2H2O→CH3OH+½O2

For a 6 e− reduction, the reactions at the cathode and anode may be represented as follows:

CO2+6H++6e−→CH3OH+H2O (cathode)

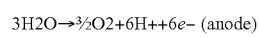
3H2O→½O2+6H++6e− (anode)

The reduction of the carbon dioxide may be suitably achieved efficiently in a divided electrochemical or photoelectrochemical cell in which (i) a compartment contains an anode that is an inert counter electrode and (ii) another compartment contains a working cathode electrode and a catalyst.

The compartments may be separated by a porous glass frit or other ion conducting bridge. Both compartments generally contain an aqueous solution of an electrolyte. Carbon dioxide gas may be continuously bubbled through the cathodic electrolyte solution to saturate the solution.

In the working electrode compartment, carbon dioxide may be continuously bubbled through the solution. In some embodiments, if the working electrode is a conductor, an external bias may be impressed across the cell such that the potential of the working electrode is held constant. In other embodiments, if the working electrode is a p-type semiconductor, the electrode may be suitably illuminated with light. An energy of the light may be matching or greater than a bandgap of the semiconductor during the electrolysis. Furthermore, either no external source of electrical energy may be used or a modest bias (e.g., about 500 millivolts) may be applied. The working electrode potential is generally held constant relative to the SCE. The electrical energy for the electrochemical reduction of carbon dioxide may come from a normal energy source, including nuclear and alternatives (e.g., hydroelectric, wind, solar power, geothermal, etc.), from a solar cell or other nonfossil fuel source of electricity, provided that the electrical source supply at least 1.6 volts across the cell. Other voltage values may be adjusted depending on the internal resistance of the cell employed.

Advantageously, the carbon dioxide may be obtained from any sources (e.g., an exhaust stream from fossil-fuel burning power or industrial plants, from geothermal or natural gas wells or the atmosphere itself). Most suitably, the carbon dioxide may be obtained from concentrated point sources of generation prior to being released into the atmosphere. For example, high concentration carbon dioxide sources may frequently accompany natural gas in amounts of 5% to 50%, exist in flue gases of fossil fuel (e.g., coal, natural gas, oil, etc.) burning power plants and nearly pure carbon dioxide may be exhausted from cement factories and from fermenters used for industrial fermentation of ethanol. Certain geothermal steams may also contain significant amounts of carbon dioxide. The carbon dioxide emissions from varied industries, including geothermal wells, may be captured on-site. Separation of the carbon dioxide from such exhausts is known. Thus, the capture and use of existing atmospheric carbon dioxide in accordance with some embodiments of the present invention generally allow the carbon dioxide to be a renewable and unlimited source of carbon.

For electrochemical conversions, the carbon dioxide may be readily reduced in an aqueous medium with a conductive electrode. Faradaic efficiencies have been found high, some reaching about 100%. For photoelectrochemical conversions, the carbon dioxide may be readily reduced with a p-type semiconductor electrode, such as p-GaP, p-GaAs, p-InP, p-InN, p-WSe$_2$, p-CdTe, p-GaInP$_2$ and p-Si.

The electrochemical/photoelectrochemical reduction of the carbon dioxide generally utilizes one or more catalysts in the aqueous solution. Aromatic heterocyclic amines may include, but are not limited to, unsubstituted and substituted pyridines and imidazoles. Substituted pyridines and imidazoles may include, but are not limited to mono and disubstituted pyridines and imidazoles. For example, suitable catalysts may include straight chain or branched chain lower alkyl (e.g., C1-C10) mono and disubstituted compounds such as 2-methylpyridine, 4-tertbutyl pyridine, 2,6-dimethylpyridine (2,6-lutidine); bipyridines, such as 4,4'-bipyridine; amino-substituted pyridines, such as 4-dimethylamino pyridine; and hydroxyl-substituted pyridines (e.g., 4-hydroxy-pyridine) and substituted or unsubstituted quinoline or isoquinolines. The catalysts may also suitably include substituted or unsubstituted dinitrogen heterocyclic amines, such as pyrazine, pyridazine and pyrimidine. Other catalysts generally include azoles, imidazoles, indoles, oxazoles, thiazoles, substituted species and complex multi-ring amines such as adenine, pterin, pteridine, benzimidazole, phenonthroline and the like.

Referring to FIG. 1, a block diagram of a system 100 is shown in accordance with a preferred embodiment of the present invention. The system (or apparatus) 100 generally comprises a cell (or container) 102, a liquid source 104, a power source 106, a gas source 108, an extractor 110 and an extractor 112. A product may be presented from the extractor 110. An output gas may be presented from the extractor 112. Another output gas may be presented from the cell 102.

The cell 102 may be implemented as a divided cell. The divided cell may be a divided electrochemical cell and/or a divided photochemical cell. The cell 102 is generally operational to reduce carbon dioxide ($CO_2$) and protons into one or more organic products and/or inorganic products. The reduction generally takes place by bubbling carbon dioxide into an aqueous solution of an electrolyte in the cell 102. A cathode in the cell 102 may reduce the carbon dioxide into one or more compounds.

The cell 102 generally comprises two or more compartments (or chambers) 114a-114b, a separator (or membrane) 116, an anode 118 and a cathode 120. The anode 118 may be disposed in a given compartment (e.g., 114a). The cathode 120 may be disposed in another compartment (e.g., 114b) on a side of the separator 116 opposite the anode 118. An aqueous solution 122 may fill both compartments 114a-114b. A catalyst 124 may be added to the compartment 114b containing the cathode 120.

The liquid source 104 may implement a water source. The liquid source 104 may be operational to provide pure water to the cell 102.

The power source 106 may implement a variable voltage source. The source 106 may be operational to generate an electrical potential between the anode 118 and the cathode 120. The electrical potential may be a DC voltage.

The gas source 108 may implement a carbon dioxide source. The source 108 is generally operational to provide carbon dioxide to the cell 102. In some embodiments, the carbon dioxide is bubbled directly into the compartment 114b containing the cathode 120 and the electrolyte 122. In a preferred embodiment, a carbon dioxide-saturated electrolyte is introduced to the cell 102. The electrolyte 122 may include one or more of Na2SO4, KHCO3, KCl, NaNO3, NaCl, NaF, NaClO4, KClO4, K2SiO3, CaCl2, a guanidinium cation, an H cation, an alkali metal cation, an ammonium cation, an alkylammonium cation, a halide ion, an alkyl amine, a borate, a carbonate, a guanidinium derivative, a nitrite, a nitrate, a phosphate, a polyphosphate, a perchlorate, a silicate, a sulfate, and a tetraalkyl ammonium salt.

The extractor 110 may implement an organic product and/or inorganic product extractor. The extractor 110 is generally operational to extract (separate) products (e.g., formic acid, acetone, glyoxal, isopropanol, formaldehyde, methanol, polymers and the like) from the electrolyte 122. The extracted products may be presented through a port 126 of the system 100 for subsequent storage and/or consumption by other devices and/or processes.

The extractor 112 may implement an oxygen extractor. The extractor 112 is generally operational to extract oxygen (e.g., $O_2$) byproducts created by the reduction of the carbon dioxide and/or the oxidation of water. The extracted oxygen may be presented through a port 128 of the system 100 for subsequent storage and/or consumption by other devices and/or processes. Chlorine and/or oxidatively evolved chemicals may also be byproducts in some configurations. The organic pollutants may be rendered harmless by oxidization. Any other excess gases (e.g., hydrogen) created by the reduction of the carbon dioxide may be vented from the cell 102 via a port 130.

In the process described, water may be oxidized (or split) to protons and oxygen at the anode 118 while the carbon dioxide is reduced to organic products at the cathode 120. The electrolyte 122 in the cell 102 may use water as a solvent with any salts that are water soluble and with a pyridine or pyridine-derived catalyst 124. The catalysts 124 may include, but are not limited to, nitrogen, sulfur and oxygen containing heterocycles. Examples of the heterocyclic compounds may be pyridine, imidazole, pyrrole, thiazole, furan, thiophene and the substituted heterocycles such as amino-thiazole and benzimidazole. Cathode materials generally include any conductor. Any anode material may be used. The overall process is generally driven by the power source 106. Combinations of cathodes 120, electrolytes 122, catalysts 124, introduction of carbon dioxide to the cell 102, introduction of divalent cations (e.g., $Ca^{2+}$, $Mg^{2+}$, $Zn^{2+}$) to the electrolytes 122 pH levels and electric potential from the power source 106 may be used to control the reaction products of the cell 102. For instance, the pH of electrolyte solution may be maintained between about pH 1 and pH 8 with a suitable range depending on what product or products are desired. Organic products and inorganic products resulting from the reaction may include, but are not limited to, acetaldehyde, acetate, acetic acid, acetone, 1-butanol, 2-butanol, 2-butanone, carbon, carbon monoxide, carbonates, ethane, ethanol, ethylene, formaldehyde, formate, formic acid, glycolate, glycolic acid, glyoxal, glyoxylate, glyoxylic acid, graphite, isopropanol, lactate, lactic acid, methane, methanol, oxalate, oxalic acid, a polymer containing carbon dioxide, 1-propanal, 1-propanol, and propionic acid.

In particular implementations, the cell 102 includes a tin (Sn) cathode for the production of formate. A catalyst is preferably used, with the catalyst preferably including one or more of 2-picoline and 2,6-lutadine. The preferred catalyst concentration is between about 1 ppm and 100 mM, and more preferably between about 0.01 mM and 30 mM. The electrolyte in the cell 102 may include potassium chloride with a concentration of 0.5 M, however other electrolytes may be utilized, including but not limited to, another chloride electrolyte (e.g., LiCl, CsCl, $NH_4Cl$), a perchlorate electrolyte, a phosphate electrolyte, a bicarbonate electrolyte, and a sulfate electrolyte. During operation of the cell, a surface hydroxide may develop on the surface of the tin cathode. Such surface hydroxide development may lead to a decrease in current density of the cell, but product yields may remain stable for an extended period of time. For example, in one preferred embodiment, stable yields were obtained in a duration that exceeded 145 hours. To address the surface hydroxide development, an acidic solution may be introduced to the cathode compartment, where additional protons may be made available at the cathode surface to reduce the hydroxide to water. A pH buffer may be utilized to maintain a preferred pH range in the cathode compartment of between about 1 and 7, with a more preferable pH range of between 3 and 6, and even more preferable pH range of between 3 and 4.5. In one embodiment, the pH buffer is a phosphate buffer, which may be a 0.2M phosphate buffer. A cation mixture may also be introduced to the catholyte compartment which also may address the formation of the surface hydroxide development. Preferred cations include mid-sized cations, such as potassium ($K^+$) and cesium ($Cs^+$), which may be introduced in a molar ratio of potassium to cesium of between about 1:1000 and 1000:1.

In some nonaqueous embodiments, the solvent may include methanol, acetonitrile, and/or other nonaqueous solvents. The electrolytes 122 generally include tetraalkyl ammonium salts and a heterocyclic catalyst. A primary product may be oxalate in a completely nonaqueous system. In a system containing a nonaqueous catholyte and an aqueous anolyte, the products generally include all of the products seen in aqueous systems with higher yields.

Experiments were conducted in one, two and three-compartment electrochemical cells 102 with an SCE as the reference electrode. The experiments were generally conducted at ambient temperature and pressure. Current densities were observed to increase with increased temperature, but the experiments were generally operated at ambient temperature for best efficiency. Carbon dioxide was bubbled into the cells during the experiments. A potentiostat or DC power supply 106 provided the electrical energy to drive the process. Cell potentials ranged from 2 volts to 4 volts, depending on the cathode material. Half cell potentials at the cathode ranged from −0.7 volts to −2 volts relative to the SCE, depending on the cathode material used. Products from the experiments were analyzed using gas chromatography and a spectrometer.

The process is generally controlled to get a desired product by using combinations of specific cathode materials, catalysts, electrolytes, surface morphology of the electrodes, introduction of reactants relative to the cathode, introduction of divalent cations to the electrolyte, adjusting pH levels and/or adjusting electrical potentials. Faradaic yields for the products generally range from less than 1% to more than 90% with the remainder being hydrogen, although methane, carbon monoxide and/or ethylene may also be produced as gaseous byproducts.

Referring to FIGS. 2A-2C, tables illustrating relative product yields for different cathode material, catalyst, electrolyte, pH level and cathode potential combinations are shown. The combinations listed in the tables generally are not the only combinations providing a given product. The combinations illustrated may demonstrate high yields of the products at the lowest potential. The cathodes tested generally include all conductive elements on the periodic table, steels, nickel alloys, copper alloys such as brass and bronze and elgiloy. Most of the conductors may be used with heterocyclic catalysts 124 to reduce the carbon dioxide. The products created may vary based on which cathode material is used. For instance, a W cathode 120 with pyridine catalyst 124 may give acetone as a product whereas a Sn cathode 120 with pyridine may primarily give formic acid and methanol as products. A product yield may also be changed by the manner in which the carbon dioxide was bubbled into the cell 102. For instance, with a stainless steel 2205 cathode 120 in a KCl electrolyte 122, if the carbon dioxide bubbles directly contact the cathode 120, the product mix may switch to methanol and isopropanol, rather than formic acid and acetone when the carbon dioxide bubbles avoid contact with the cathode 120 (i.e., the carbon dioxide bubbles circumvent the cathode 120 in the cell 102).

Cell design and cathode treatment (e.g., surface morphology or surface texture) may affect both product yields and current density at the cathode. For instance, a divided cell 102 with a stainless steel 2205 cathode 120 in a KCl electrolyte 122 generally has higher yields with a heavily scratched (rough) cathode 120 than an unscratched (smooth) cathode 120. In some embodiments, the roughness or smoothness of a cathode surface may be determined by a comparison between a surface area measurement and the geometric surface area of the cathode, where the greater the difference between the surface area measurement and the geometric surface area, the rougher the cathode. Matte tin generally performs different than bright tin. Maintaining carbon dioxide bubbling only on the cathode side of the divided cell 102 (e.g., in compartment 114b) may also increase yields.

Raising or lowering the cathode potential may also alter the reduced products. For instance, ethanol is generally evolved at lower potentials between −0.8 volts and −1 volt using the duplex steel/pyridine/KCl, while methanol is favored beyond −1 volt.

Faradaic yields for the products may be improved by controlling the electrical potential of the reaction. By maintaining a constant potential at the cathode 120, hydrogen evolution is generally reduced and faradaic yields of the products increased. Addition of hydrogen inhibitors, such as acetonitrile, certain heterocycles, alcohols, and other chemicals may also increase yields of the products.

With some embodiments, stability may be improved with cathode materials known to poison rapidly when reducing carbon dioxide. Copper and copper-alloy electrodes commonly poison in less than an hour of electrochemically reducing carbon dioxide. However, when used with a heterocyclic amine catalyst, copper-based alloys were operated for many hours without any observed degradation in effectiveness. The effects were particularly enhanced by using sulfur containing heterocycles. For instance, a system with a copper cathode and 2-amino thiazole catalyst showed very high stability for the reduction of carbon dioxide to carbon monoxide and formic acid.

Heterocycles other than pyridine may catalytically reduce carbon dioxide in the electrochemical process using many aforementioned cathode materials, including tin, steels, nickel alloys and copper alloys. Nitrogen-containing heterocyclic amines shown to be effective include azoles, indoles, 4,4'-bipyridines, picolines (methyl pyridines), lutidines (dimethyl pyridines), hydroxy pyridines, imidazole, benzimidazole, methyl imidazole, pyrazine, pyrimidine, pyridazine, pyridazineimidazole, nicotinic acid, quinoline, adenine and 1,10-phenanthroline. Sulfur containing heterocycles include thiazole, aminothiazoles, thiophene. Oxygen containing heterocycles include furan and oxazole. As with pyridine, the combination of catalyst, cathode material and electrolyte may be used to control product mix.

Some process embodiments of the present invention for making/converting hydrocarbons generally consume a small amount of water (e.g., approximately 1 to 3 moles of water) per mole of carbon. Therefore, the processes may be a few thousand times more water efficient than existing production techniques.

Figure 3:
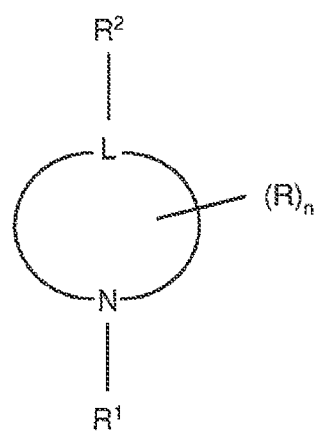
FIG. 3 is a formula of an aromatic heterocyclic amine catalyst.

Referring to FIG. 3, a formula of an aromatic heterocyclic amine catalyst is shown. The ring structure may be an aromatic 5-member heterocyclic ring or 6-member heterocyclic ring with at least one ring nitrogen and is optionally substituted at one or more ring positions other than nitrogen with R. L may be C or N. R1 may be H. R2 may be H if L is N or R2 is R if L is C. R is an optional substitutent on any ring carbon and may be independently selected from H, a straight chain or branched chain lower alkyl, hydroxyl, amino, pyridyl, or two R's taken together with the ring carbons bonded thereto are a fused six-member aryl ring and n=0 to 4.

Figure 4:
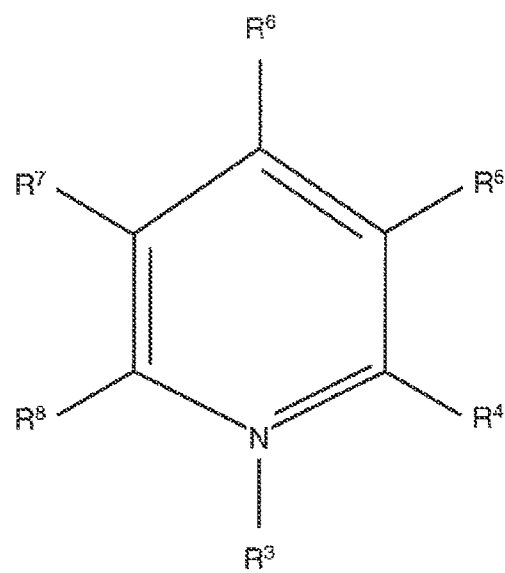
FIGS. 4-6 are formulae of substituted or unsubstituted aromatic 5-member heterocyclic amines or 6-member heterocyclic amines.
Figure 5:
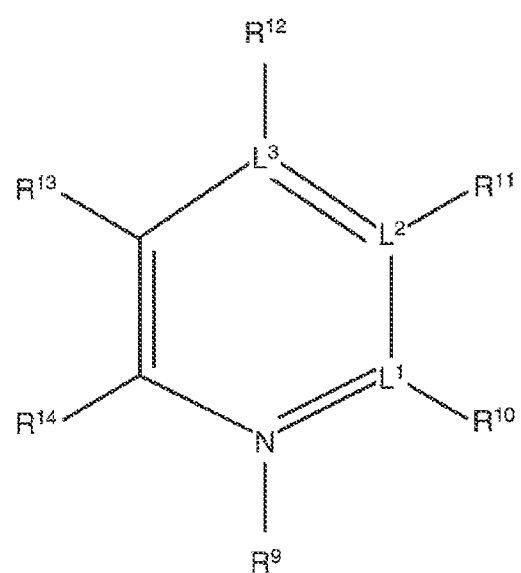
Figure 6:
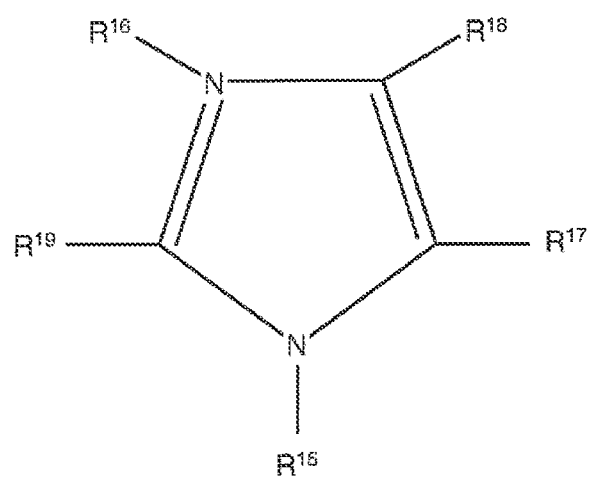

Referring to FIGS. 4-6, formulae of substituted or unsubstituted aromatic 5-member heterocyclic amines or 6-member heterocyclic amines are shown. Referring to FIG. 4, R3 may be H. R4, R5, R7 and R8 are generally independently H, straight chain or branched chain lower alkyl, hydroxyl, amino, or taken together are a fused six-member aryl ring. R6 may be H, straight chain or branched chain lower alkyl, hydroxyl, amino or pyridyl.

Referring to FIG. 5, one of L1, L2 and L3 may be N, while the other L's may be C. R9 may be H. If L1 is N, R10 may be H. If L2 is N, R11 may be H. If L3 is N, R12 may be H. If L1, L2 or L3 is C, then R10, R11, R12, R13 and R14 may be independently selected from straight chain or branched chain lower alkyl, hydroxyl, amino, or pyridyl.

Referring to FIG. 6, R15 and R16 may be H. R17, R18 and R19 are generally independently selected from straight chain or branched chain lower alkyl, hydroxyl, amino, or pyridyl.

Suitably, the concentration of aromatic heterocyclic amine catalysts is about 1 millimolar (mM) to 1 M. The electrolyte may be suitably a salt, such as KCl, $KHCO_3$, $NaNO_3$, $Na_2SO_4$, $NaClO_4$, NaF, $NaClO_4$, $KClO_4$, $K_2SiO_3$, or $CaCl_2$ at a concentration of about 0.5 M. Other electrolytes may include, but are not limited to, all group 1 cations (e.g., H, Li, Na, K, Rb and Cs) except Francium (Fr), Ca, ammonium cations, alkylammonium cations and alkyl amines. Additional electrolytes may include, but are not limited to, all group 17 anions (e.g., F, Cl, Br, I and At), borates, carbonates, nitrates, nitrites, perchlorates, phosphates, polyphosphates, silicates and sulfates. Na generally performs as well as K with regard to best practices, so NaCl may be exchanged with KCl. NaF may perform about as well as NaCl, so NaF may be exchanged for NaCl or KCl in many cases. Larger anions tend to change the chemistry and favor different products. For instance, sulfate may favor polymer or methanol production while Cl may favor products such as acetone. The pH of the solution is generally maintained at about pH 3 to 8, suitably about 4.7 to 5.6.

At conductive electrodes, formic acid and formaldehyde were found to be intermediate products along the pathway to the 6 e− reduced product of methanol, with an aromatic amine radical (e.g., the pyridinium radical, playing a role in the reduction of both intermediate products). The intermediate products have generally been found to also be the final products of the reduction of carbon dioxide at conductive electrodes or p-type semiconductor electrodes, depending on the particular catalyst used. Other C—C couple products may also be possible. For example, reduction of carbon dioxide may suitably yield formaldehyde, formic acid, glyoxal, methanol, isopropanol, or ethanol, depending on the particular aromatic heterocyclic amine used as the catalyst. The products of the reduction of carbon dioxide are generally substitution-sensitive. As such, the products may be selectively produced. For example, use of 4,4'-bipyridine as the catalyst may produce methanol and/or 2-propanol. Lutidines and amino-substituted pyridines may produce 2-propanol. Hydroxy-pyridine may produce formic acid.

The effective electrochemical/photoelectrochemical reduction of carbon dioxide disclosed herein may provide new methods of producing methanol and other related products in an improved, efficient, and environmentally beneficial way, while mitigating carbon dioxide-caused climate change (e.g., global warming). Moreover, the methanol product of reduction of carbon dioxide may be advantageously used as (1) a convenient energy storage medium, which allows convenient and safe storage and handling, (2) a readily transported and dispensed fuel, including for methanol fuel cells and (3) a feedstock for synthetic hydrocarbons and corresponding products currently obtained from oil and gas resources, including polymers, biopolymers and even proteins, that may be used for animal feed or human consumption. Importantly, the use of methanol as an energy storage and transportation material generally eliminates many difficulties of using hydrogen for such purposes. The safety and versatility of methanol generally makes the disclosed reduction of carbon dioxide further desirable.

Some embodiments of the present invention may be further explained by the following examples, which should not be construed by way of limiting the scope of the invention.

Example 1

General Electrochemical Methods

Chemicals and materials. All chemicals used were >98% purity and used as received from the vendor (e.g., Aldrich), without further purification. Either deionized or high purity water (Nanopure, Barnstead) was used to prepare the aqueous electrolyte solutions.

Electrochemical system. The electrochemical system was composed of a standard two-compartment electrolysis cell 102 to separate the anode 118 and cathode 120 reactions. The compartments were separated by a porous glass frit or other ion conducting bridge 116. The electrolytes 122 were used at concentrations of 0.1 M to 1 M, with 0.5 M being a typical concentration. A concentration of between about 1 mM to 1 M of the catalysts 124 were used. The particular electrolyte 122 and particular catalyst 124 of each given test were generally selected based upon what product or products were being created.

Figure 7:
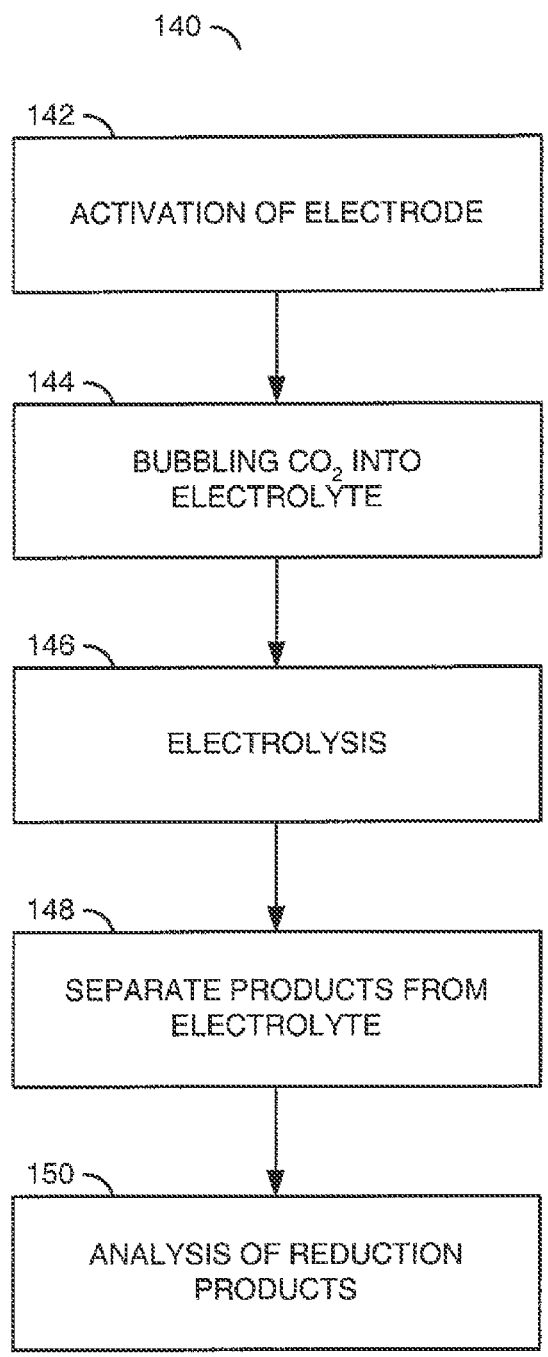
FIG. 7 is a flow diagram of an example method used in electrochemical examples.

Referring to FIG. 7, a flow diagram of an example method 140 used in the electrochemical examples is shown. The method (or process) 140 generally comprises a step (or block) 142, a step (or block) 144, a step (or block) 146, a step (or block) 148 and a step (or block) 150. The method 140 may be implemented using the system 100.

In the step 142, the electrodes 118 and 120 may be activated where appropriate. Bubbling of the carbon dioxide into the cell 102 may be performed in the step 144. Electrolysis of the carbon dioxide into organic and/or inorganic products may occur during step 146. In the step 148, the products may be separated from the electrolyte. Analysis of the reduction products may be performed in the step 150.

The working electrode was of a known area. All potentials were measured with respect to a saturated calomel reference electrode (Accumet). Before and during all electrolysis, carbon dioxide (Airgas) was continuously bubbled through the electrolyte to saturate the solution. The resulting pH of the solution was maintained at about pH 3 to pH 8 with a suitable range depending on what product or products were being made. For example, under constant carbon dioxide bubbling, the pH levels of 10 mM solutions of 4-hydroxy pyridine, pyridine and 4-tertbutyl pyridine were 4.7, 5.28 and 5.55, respectively. For Nuclear Magnetic Resonance (NMR) experiments, isotopically enriched $^{13}C$ $NaHCO_3$ (99%) was obtained from Cambridge Isotope Laboratories, Inc.

Example 2

General Photoelectrochemical Methods

Chemicals and materials. All chemicals used were analytical grade or higher. Either deionized or high purity water (Nanopure, Barnstead) was used to prepare the aqueous electrolyte solutions.

Photoelectrochemical system. The photoelectrochemical system was composed of a Pyrex three-necked flask containing 0.5 M KCl as supporting electrolyte and a 1 mM to 1 M catalyst (e.g., 10 mM pyridine or pyridine derivative). The photocathode was a single crystal p-type semiconductor etched for approximately 1 to 2 minutes in a bath of concentrated $HNO_3$:HCl, 2:1 v/v prior to use. An ohmic contact was made to the back of the freshly etched crystal using an indium/zinc (2 wt. % Zn) solder. The contact was connected to an external lead with conducting silver epoxy (Epoxy Technology H31) covered in glass tubing and insulated using an epoxy cement (Loctite 0151 Hysol) to expose only the front face of the semiconductor to solution. All potentials were referenced against a saturated calomel electrode (Accumet). The three electrode assembly was completed with a carbon rod counter electrode to minimize the reoxidation of reduced carbon dioxide products. During all electrolysis, carbon dioxide gas (Airgas) was continuously bubbled through the electrolyte to saturate the solution. The resulting pH of the solution was maintained at about pH 3 to 8 (e.g., pH 5.2).

Figure 8:
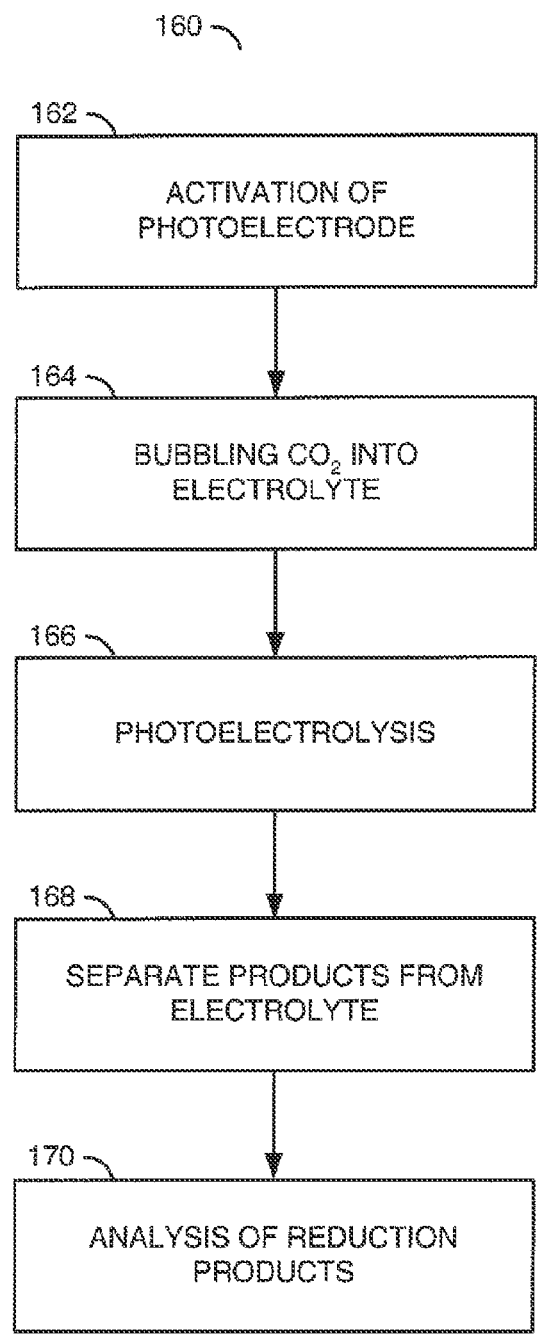
FIG. 8 is a flow diagram of an example method used in photochemical examples.

Referring to FIG. 8, a flow diagram of an example method 160 used in the photochemical examples is shown. The method (or process) 160 generally comprises a step (or block) 162, a step (or block) 164, a step (or block) 166, a step (or block) 168 and a step (or block) 170. The method 160 may be implemented using the system 100.

In the step 162, the photoelectrode may be activated. Bubbling of the carbon dioxide into the cell 102 may be performed in the step 164. Electrolysis of the carbon dioxide into the products may occur during step 166. In the step 168, the products may be separated from the electrolyte. Analysis of the reduction products may be performed in the step 170.

Light sources. Four different light sources were used for the illumination of the p-type semiconductor electrode. For initial electrolysis experiments, a Hg—Xe arc lamp (USHIO UXM 200H) was used in a lamp housing (PTI Model A-1010) and powered by a PTI LTS-200 power supply. Similarly, a Xe arc lamp (USHIO UXL 151H) was used in the same housing in conjunction with a PTI monochromator to illuminate the electrode at various specific wavelengths.

A fiber optic spectrometer (Ocean Optics 52000) or a silicon photodetector (Newport 818-SL silicon detector) was used to measure the relative resulting power emitted through the monochromator. The flatband potential was obtained by measurements of the open circuit photovoltage during various irradiation intensities using the 200 watt (W) Hg—Xe lamp (3 $W/cm^2$-23 $W/cm^2$). The photovoltage was observed to saturate at intensities above approximately 6 $W/cm^2$.

For quantum yield determinations, electrolysis was performed under illumination by two different light-emitting diodes (LEDs). A blue LED (Luxeon V Dental Blue, Future Electronics) with a luminous output of 500 milliwatt (mW)+/−50 mW at 465 nanometers (nm) and a 20 nm full width at half maximum (FWHM) was driven at to a maximum rated current of 700 mA using a Xitanium Driver (Advance Transformer Company). A Fraen collimating lens (Future Electronics) was used to direct the output light. The resultant power density that reached the window of the photoelectrochemical cell was determined to be 42 $mW/cm^2$, measured using a Scientech 364 thermopile power meter and silicon photodetector. The measured power density was assumed to be greater than the actual power density observed at the semiconductor face due to luminous intensity loss through the solution layer between the wall of the photoelectrochemical cell and the electrode.

Example 3

Analysis of Products of Electrolysis

Electrochemical experiments were generally performed using a CH Instruments potentiostat or a DC power supply with current logger to run bulk electrolysis experiments.

Gas Chromatography. The electrolysis samples were analyzed using a gas chromatograph (HP 5890 GC) equipped with a FID detector.

Spectrophotometry. The presence of formaldehyde and formic acid was also determined by the chromotropic acid assay.

Mass spectrometry. Mass spectral data was also collected to identify all organic compounds.

Nuclear Magnetic Resonance. NMR spectra of electrolyte volumes after bulk electrolysis were also obtained using an automated Bruker Ultrashield™ 500 Plus spectrometer.

The following Table may provide other examples of embodiments of the present invention.

TABLE 1

| Cathode | Catalyst | Electrolyte | Results |
|---|---|---|---|
| Pt | 10 mM pyr | 0.5M KCl | |
| Cu | 10 mM pyr | 0.5M KCl | |
| SS2205 (E = −0.9 V) | 10 mM pyr | 0.5M KCl | IC: 0.44% acetate + 0.14% formate (−0.9 V), ~2% acetate (−0.4 mA/cm2) NMR: acetate |
| Ni625 (E = −0.8 V) | 10 mM pyr | 0.5M KCl | IC: acetate(0.04%). GC: Trace 1-Pyr—Al (0.002%) NMR: Me—OH |
| PdAg (−1.13 V) | 10 mM pyr | 0.1M CaCl$_2$ | IC: 2.3% acetate |
| PdAg (−1 V) | 10 mM pyr | 0.1M CaCl$_2$ | IC: 69% acetate GC: trace 1-Bu—OH(~0.1%) NMR: acetate |
| NiCr (−1 V) | 10 mM pyr | 0.5M KCl | IC: Acetate(<0.01%) GC: 0.44% IPA + 0.4% 1-Pyr—Al NMR: Et—OH |
| CoNiCr (−0.9 V) | 10 mM pyr | 0.5M KCl | NMR: Me—OH |
| ss 316 (−1 V) | 10 mM pyr | 0.1M TMAC | GC: 3% 1-pyr—OH, 0.2% Me—OH + 0.47% Bu—OH |
| Mo (−0.85 V) | 10 mM pyr | 0.1M TMAC | IC: 0.25% Acetate GC: 0.15% 2-Bu—OH |
| Pb (−1.57 V) | 10 mM pyr | 40 wt % TEAC | IC: 17% Formate and 0.2% glycolate GC: 0.3% Et—OH NMR: Et—OH |
| C (−1.6 V) | 10 mM pyr | 40 wt % TEAC | IC: Trace Formate: 0.2% GC: 0.2% 1pyr—Al NMR: Et—OH |
| Bi (−1.33 V) | 10 mM pyr | 40 wt % TEAC | IC: Trace Formate: 0.4% GC: 1.5% Me—OH + 0.08% Acetone NMR: Me—OH |
| SnPb (−1.46 V) | 10 mM pyr | 40 wt % TEAC | IC: 7% Formate GC: 1.4% Et—OH + <1% acetone NMR: Et—OH |
| Pb | 30 mM 4-aminopyr | 0.5M KCl high pH | |
| C (−1.6 V) | 30 mM 4-aminopyr | 0.5M KCl high pH | IC: trace formate NMR: acetate |
| Bi (−1.2 V) | 30 mM 4-aminopyr | 0.5M KCl high pH | IC: trace formate |
| SnPb (−1.46 V) | 30 mM 4-aminopyr | 0.5M KCl high pH | IC: 0.88% acetate + 1.64% formate NMR: Acetate |
| Pb −1.744 V | — | 0.1M TMAC-High pH | IC: 0.26% glycolate |
| Pb −1.944 V | — | 0.1M TMAC-High pH | IC: 4% formate + 0.1% glyolate NMR: Me—OH |
| C −0.945 V | — | 0.1M TMAC/TMAOH | IC: Trace Formate + 24% acetate |
| Pb −1.745 V | — | 0.1M TMAC/MeOH | IC: Trace formate |
| C (−1.6 V) | 10 mM pyr | 0.5M KCl | IC: Acetate (FY 1%) GC: 1-Pyr—Al (0.0056%) NMR: acetate and Me—OH |
| Pb (−1.57 V) | 10 mM pyr | 0.5M KCl | IC: formate(20%) + lactate (~0.58% FY) GC: MeOH (0.4%) + 1-Pyr—Al (0.08%) |
| Au (−1.07 V) | 10 mM pyr | 0.5M KCl | IC: Trace formate |
| Zn (−1.5 V) | 10 mM pyr | 0.5M KCl | IC: 5% formate GC: 0.026% 2-Bu—OH |
| Bi (−1.33 V) | 10 mM pyr | 0.5M KCl | IC: 16% formate |
| In (−1.32 V) | 10 mM pyr | 0.5M KCl | IC: 8% formate |
| Sn (−1.33 V) | 10 mM pyr | 0.5M KCl | IC: 25% formate |
| SnAg (−1.33 V) | 10 mM pyr | 0.5M KCl | IC: 11% formate GC: 4.45% acetone + 2.77% 1pyr—Al + 0.15% Et—OH NMR: acetone |
| SnSb (−1.41 V) | 10 mM pyr | 0.5M KCl | IC: 9% formate GC: 2.76% Me—OH NMR: acetate and MeOH |

TABLE 1-continued

| Cathode | Catalyst | Electrolyte | Results |
|---|---|---|---|
| SnPb (−1.46 V) | 10 mM pyr | 0.5M KCl | IC: 5% formate<br>GC: 23% acetone<br>NMR: acetone |
| Ni625 (−1.13 V) | 10 mM pyr | 0.5M KCl | IC: Trace Formate |
| Mo (−1 V) | 10 mM pyr | 0.5M KCl | IC: Trace formate(<0.1%) |
| PdAg (−0.87 V) | 10 mM pyr | 0.5M KCl | GC: 0.04% Acetone + 0.06% 2-Bu—OH<br>NMR: acetate |
| NiFe (−1.1 V) | 10 mM pyr | 0.5M KCl | IC: Trace formate <0.1% |
| ss316 (−0.94 V) | 10 mM pyr | 0.5M KCl | NMR: Me—OH |
| ss304 (−0.97 V) | 10 mM pyr | 0.5M KCl | IC: Trace oxlate, formate (~0.01% each), 3.97% acetate<br>NMR: Me—OH and acetate |
| ss321 (−1 V) | 10 mM pyr | 0.5M KCl | IC: 0.11% Oxlate, 0.17% acetate + trace Formate<br>NMR: acetate and Me—OH |
| NiHX (−1 V) | 10 mM pyr | 0.5M KCl | GC: 0.22% Me—OH + 0.01% 2-Bu—OH<br>NMR: acetate |
| Rh (−0.85 V) | 10 mM pyr | 0.5M KCl | GC: 0.57% Me—OH + 0.05% Acetone + 0.06% 2-Bu—OH<br>NMR: acetate and Me—OH |
| Co (−1.08 V) | 10 mM pyr | 0.5M KCl | IC: Trace formate + 0.19% acetate<br>NMR: acetate |
| PtRh | 10 mM pyr | 0.5M KCl | 10% CE acetic acid with trace formic acid and methanol |
| ss304 (−0.7 V) | 10 mM pyr | 0.5M KCl | 2.2% acetate, 3.65% Me—OH |
| Rh (−0.65 V) | 10 mM pyr | 0.5M KCl | 0.8%-12.6% acetate, .06%-7.7% glycolate, 0.02-0.07% IPA, 0.005-1.09% Bu—OH, 0-0.41% acetone |
| NiCr 60:16 (with Fe) (−0.7 V) | 10 mM pyr | 0.5M KCl | IC: Trace fomate, 0.7% acetate |
| PdAg (−0.55 V) | 10 mM pyr | 0.5M KCl | IC: Trace formate, 4% acetate |
| CoS (−1.2 V) | 10 mM pyr | 0.5M KCl | IC: 0.3% FA, trace oxalate, 1.4% Acetate<br>GC: Trace IPA, EtOH, acetone, prAL, 1-BuOH<br>NMR: 1-BuOH, piperidine |
| $MoS_2$ (−1.4 V) | 10 mM pyr | 0.5M KCl | IC: 1.1% FA, 0.02% Oxalate<br>NMR: MeOH, (EtOH or BuOH) |
| TiB (−1.0 V) | 10 mM pyr | 0.5M KCl | IC: 0.1% FA, 0.08% Oxalate, 0.005% glycolate |
| $WS_2$ (−1.0 V) | 10 mM pyr | 0.5M KCl | IC: 0.2% FA, 1.6% acetate |
| SnS (−1.2 V) | 10 mM pyr | 0.5M KCl | IC: 0.64% FA, 14% FY acetate<br>GC: 0.77% acetone, 0.8% 1-BuOH<br>NMR: MeOH, 1-BuOH, Propylene glycol |
| $Ag_2S$ (−1.2 V) | 10 mM pyr | 0.5M KCl | IC: 0.04% FA, 2.8% acetate |
| $CoP_2$ (−1.2 V) | 10 mM pyr | 0.5M KCl | IC: 0.2% FA, 0.005% oxalate, 4% acetate<br>GC: trace 1-BuOH, acetone<br>NMR: 2-BuOH, propylene glycol. |
| $Fe_3P$ (−1.1 V or 5 mA) | 10 mM pyr | 0.5M KCl | IC: 0.27% FA, 1.5% Acetate<br>GC: trace amounts of EtOH, acetone, PrAl<br>NMR: EtOH, MeOH, acetone |
| $Mn_3P_2$ (−1.0 V) | 10 mM pyr | 0.5M KCl | IC: 3% FY glycolate, 30% FY acetate, 0.6% FA<br>GC: trace acetone PrAl |
| MoP (−0.8 V) | 10 mM pyr | 0.5M KCl | IC: 0.32% FA, 35% acetate, 0.8% Oxalate<br>GC: trace Acetone, MeOH<br>NMR: MeOH, 1-BuOH |
| $Ni_2Si$ (−1.0 V) | 10 mM pyr | 0.5M KCl | IC: 0.08% FA, 0.4% acetic |
| $MoSi_2$ (−1.0 V) | 10 mM pyr | 0.5M KCl | |
| $WSi_2$ (−1.0 V) | 10 mM pyr | 0.5M KCl | IC: 0.6% FA, 0.2% Glycolate, 4.5% Acetate |
| $CoSi_2$ (−1.1 V) | 10 mM pyr | 0.5M KCl | IC: 1.02% FA, 15.8% Acetate |

TABLE 1-continued

| Cathode | Catalyst | Electrolyte | Results |
|---|---|---|---|
| Ebonex (TiO7) (−1.0 V or 500 uA) | 10 mM pyr | 0.5M KCl | IC: 4.3% FA, 99% acetate GC: 2.1% MeOH, 0.33% acetone, 1.2% 1-BuOH, 0.2% Butanone NMR: 1-butanol, propylene glycol, MeOH |
| SnO2 (−1.0 V or 500 uA) | 10 mM pyr | 0.5M KCl | IC: 1.75% FA, 0.09% oxalate, 65% acetate GC: 0.5% Et—OH, 0.4% acetone, 0.3% IPA NMR: IPA, 1-BuOH, MeOH, propylene glycol |
| GaAs (130 uA/cm$\hat{\ }$2) | 10 mM pyr | 0.5M KCl | IC: 12-23% CE acetic acid, 0.3-2% CE formic |
| p-GaAs (130 uA/cm$\hat{\ }$2) | 10 mM pyr | 0.5M KCl | IC: 7.3% FA, 37.5% acetate GC: 0.8% Et—OH, 0.19% acetone, 0.2% prAl, 1.32 IPA, 1.2 1-BuOH |
| p-GaAs epoxy control | 10 mM pyr | 0.5M KCl | 4 ppm MeOH, 1 ppm IPA, 0.2 ppm Et—OH, 0.15 ppm 2-BuOH |
| GaSb (−1.4 V) | 10 mM pyr | 0.5M KCl | 5% CE acetic acid, 0.6-4.5% formic acid |
| Ge (130 uA/cm$\hat{\ }$2) | 10 mM pyr | 0.5M KCl | IC: 4-19% CE acetic acid, 0.6-1.2% CE formic GC: 0.4% IPA, 0.1 1-buOH NMR: propylene glycol, acetone |
| CdSe (−1.6 V) | 10 mM pyr | 0.5M KCl | IC: 7% FA |

The following tables provide additional examples of embodiments of the present invention. In particular, Table 2 shows faradaic efficiencies for formate (HCOO$^-$) production, with a system employing a controlled potential electrolysis at −1.37V vs. SCE in $CO_2$ saturated water with a 0.5M KCl electrolyte. The catalyst concentration in the cathode compartment was 30 mM. The anode compartment contained water with 0.1667M $K_2SO_4$. The electrolysis was carried out in a three chambered glass cell with separated cathode and anode chambers. Carbon dioxide was continuously bubbled on the cathode chamber. In Table 2, j(mA/cm$^2$) represents average current density, and FY(%) represents Faradaic Yield, which was calculated from the ppm of the formate measured by IC analysis on the catholyte solution collected after the electrolysis, and the total charge passed during the electrolysis.

TABLE 2

| Catalysts | Time (hrs) | j(mA/cm$^2$) | FY (%) |
|---|---|---|---|
| pyridine | 6 | 0.78 | 20.4-21.6 |
| 4-picoline | 6 | 1.96 | 19.3-39.1 |
| Imidazole | 6 | 0.26 | 1.7-4.8 |
| 2-picoline | 6 | 1.02 | 36.4-42.2 |
| 2,6-Lutadine | 6 | 0.73 | 30-43.8 |
| Benzamidazole | 6 | 0.32 | 0.4-1.0 |
| 2,2'-bipyridine | 6 | 0.07 | 1.7-3.1 |
| Nicotinic acid | 6 | 0.21 | 13.2-13.3 |

Table 3 illustrates faradaic efficiencies for formate production using tin cathodes with 30 mM 2-picoline catalyst in the cathode compartment, with various electrolytes. The electrolytes were saturated with carbon dioxide and present in 0.5M concentrations.

TABLE 3

| Electrolytes | pH | HCOO$^-$ FY (%) |
|---|---|---|
| KCl | 6.0 | 40.0 |
| LiCl | 5.9 | 30.1 |
| CsCl | 5.8 | 40.1 |
| NH$_4$Cl | 5.9 | 34.8 |
| Na$_2$B$_4$O$_7$•10H$_2$O | 6.0 | 0.7 |
| NaH$_2$PO$_4$ | 6.0 | 26.4 |
| NaClO$_4$ | 5.74 | 34.5 |

Table 4 illustrates faradaic efficiencies for formate production using tin cathodes obtained from electrolysis in a divided H-Cell, with a controlled potential at −1.37V vs. SCE, in SCE in $CO_2$ saturated water with a 0.5M KCl electrolyte. The cathode compartment included a catalyst of 30 mM 2-picoline, with the anode compartment including water with 0.1667M $K_2SO_4$. The cathode compartment and anode compartment were separated by a proton exchange membrane (Selemion HSF). The pH was monitored continuously in situ by a glass electrode immersed in the cathode compartment.

TABLE 4

| Time (hr) | pH $^b$ | j/(mA/cm$^2$) | FY (%) |
|---|---|---|---|
| 3 | 6.0 | 0.80 | 42.0 |
| 22 | 5.88 | 0.31 | 40.7 |
| 30 | 5.94 | 0.26 | 41.3 |
| 47 | — | 0.17 | 38.4 |
| 53 | — | 0.13 | 39.4 |
| 77 | 5.93 | 0.11 | 38.5 |
| 145 | 5.97 | 0.08 | 43.0 |

Table 5 illustrates the effects of 2-picoline concentrations on faradaic efficiencies for formate production using tin electrodes. Without use of 2-picoline as a catalyst, the average faradaic yield may be about 25% for the electrolysis in the $CO_2$ saturated KCl solution.

TABLE 5

| [2-picoline] | Electrolyte | FY (%) |
|---|---|---|
| 1 mM | 0.5M KCl | 37.7 |
| 5 mM | 0.5M KCl | 40.5 |
| 30 mM | 0.5M KCl | 40.0 |
| 100 mM | 0.5M KCl | 28.6 |

Table 6 illustrates the effects of pH for formate production using tin cathodes. The pH was adjusted using HCl or KOH solution after saturating with $CO_2$.

TABLE 6

| Electrolytes | pH | FY (%) |
|---|---|---|
| 0.5M KCl | 3 | 27 |
| 0.5M KCl | 4 | 30 |
| 0.5M KCl | 5 | 28 |
| 0.5M KCl | 6 | 40 |

Table 7 illustrates faradaic efficiencies for formate production using tin cathodes buffered at 4.5 pH. The system employed a controlled potential electrolysis (−1.37V vs. SCE) in $CO_2$ saturated 0.5M KCl prepared in 0.2M phosphate buffer pH 4.5 (Alfa Aesar). The catalyst in the cathode compartment was 1 mM 2-picoline, with 0.1667M $K_2SO_4$ in the anode compartment. The cathode compartment and anode compartment were separated by a proton exchange membrane.

TABLE 7

| Time (hr) | pH With 2-picoline | pH Without 2-picoline | j (mA/cm$^2$) With 2-picoline | j (mA/cm$^2$) Without 2-picoline | FY (%) With 2-picoline | FY (%) Without 2-picoline |
|---|---|---|---|---|---|---|
| 3 | 4.69 | 4.86 | 1.16 | 3.94 | 37.1 | 5.8 |
| 6.5 | 4.71 | 5.10 | 1.08 | 3.01 | 30.0 | 2.4 |
| 23 | 4.55 | 5.17 | 0.97 | 2.90 | 28.5 | 3.0 |
| 28 | 4.57 | — | 1.01 | — | 33.5 | — |

Table 8 illustrates faradaic efficiencies for formate production using tin cathodes in water with an electrolyte including 0.25M KCl and 0.25M CsCl. The cathode compartment included 30 mM 2-picoline as a homogenous catalyst. The system employed a controlled potential electrolysis (−1.37V vs. SCE) in CO2 saturated 0.5M KCl. The anode compartment included 0.1667M K2SO4. The cathode compartment and anode compartment were separated by a proton exchange membrane. Without use of 2-picoline as a catalyst, the average faradaic yield may be about 17.2% for the electrolysis in the CO2 saturated KCl and CsCl solution.

TABLE 8

| Time (hrs) | pH | (mA/cm$^2$) | FY (%) |
|---|---|---|---|
| 24 | 5.98 | 0.26 | 44.9 |
| 30 | 5.98 | 0.25 | 63.8 |
| 96 | 6.1 | 0.14 | 45.2 |

Carbon dioxide may be efficiently converted to value-added products, using either a minimum of electricity (that may be generated from an alternate energy source) or directly using visible light. Some processes described above may generate high energy density fuels that are not fossil-based as well as being chemical feedstock that are not fossil or biologically based. Moreover, the catalysts for the processes may be substituents-sensitive and provide for selectivity of the value-added products.

By way of example, a fixed cathode (e.g., stainless steel 2205) may be used in an electrochemical system where the electrolyte and/or catalyst are altered to change the product mix. In a modular electrochemical system, the cathodes may be swapped out with different materials to change the product mix. In a hybrid photoelectrochemical system, the anode may use different photovoltaic materials to change the product mix.

Some embodiments of the present invention generally provide for new cathode materials, new electrolyte materials and new sulfur and oxygen-containing heterocyclic catalysts. Specific combinations of cathode materials, electrolytes, catalysts, pH levels and/or electrical potentials may be used to get a desired product. The organic products may include, but are not limited to, acetaldehyde, acetone, carbon, carbon monoxide, carbonates, ethanol, ethylene, formaldehyde, formic acid, glyoxal, glyoxylic acid, graphite, isopropanol, methane, methanol, oxalate, oxalic acid. Inorganic products may include, but are not limited to, polymers containing carbon dioxide. Specific process conditions may be established that maximize the carbon dioxide conversion to specific chemicals beyond methanol.

Cell parameters may be selected to minimize unproductive side reactions like $H_2$ evolution from water electrolysis. Choice of specific configurations of heterocyclic amine pyridine catalysts with engineered functional groups may be utilized in the system 100 to achieve high faradaic rates. Process conditions described above may facilitate long life (e.g., improved stability), electrode and cell cycling and product recovery. The organic products created may include methanol, formaldehyde, formic acid, glyoxal, acetone, and isopropanol using the same pyridine catalyst with different combinations of electrolytes, cathode materials, bubbling techniques and cell potentials. Heterocyclic amines related to pyridine may be used to improve reaction rates, product yields, cell voltages and/or other aspects of the reaction. Heterocyclic catalysts that contain sulfur or oxygen may also be utilized in the carbon dioxide reduction.

Some embodiments of the present invention may provide cathode and electrolyte combinations for reducing carbon dioxide to products in commercial quantities. Catalytic reduction of carbon dioxide may be achieved using steel or other low cost cathodes. High faradaic yields (e.g., >20%) of organic products with steel and nickel alloy cathodes at ambient temperature and pressure may also be achieved. Copper-based alloys used at the electrodes may remain stable for long-term reduction of carbon dioxide. The relative low cost and abundance of the combinations described above generally opens the possibility of commercialization of electrochemical carbon dioxide reduction.

Various process conditions disclosed above, including cathode materials, cathode surface morphology, electrolyte choice, catalyst choice, cell voltage, pH level and manner in which the carbon dioxide is bubbled, generally improve control of the reaction so that different products or product mixes may be made. Greater control over the reaction generally opens the possibility for commercial systems that are modular and adaptable to make different products. The new materials and process conditions combinations generally have high faradaic efficiency and relatively low cell potentials, which allows an energy efficient cell to be constructed.

While the invention has been particularly shown and described with reference to the preferred embodiments thereof, it will be understood by those skilled in the art that various changes in form and details may be made without departing from the scope of the invention.

The invention claimed is:

1. A method for reducing carbon dioxide to one or more products, comprising:
   (A) bubbling said carbon dioxide into a solution of an electrolyte and a catalyst in a divided electrochemical cell, wherein (i) said divided electrochemical cell comprises an anode in a first cell compartment and a cathode in a second cell compartment, (ii) said cathode reducing said carbon dioxide into carbon monoxide, and (iii) said catalyst is a homogeneous heterocyclic amine catalyst and said cathode is selected from the group consisting of Al, Au, Ag, Bi, C, Cd, Co, Cr, Cu, a Cu alloy, Ga, Hg, In, Mo, Nb, Ni, NiCo2O4, a Ni alloy, a Ni—Fe alloy, Pb, Rh, Sn, a Sn alloy, Ti, V, W, Zn, elgiloy, Nichrome, austenitic steel, duplex steel, ferritic steel, martensitic steel, stainless steel, degenerately doped p-Si, degenerately doped p-Si:As, degenerately doped p-Si:B, degenerately doped n-Si, degenerately doped n-Si:As, degenerately doped n-Si:B, and mixtures thereof;
   (B) separating said carbon monoxide from said solution.

2. The method according to claim 1, wherein said homogeneous heterocyclic amine catalyst is one or more of adenine, an amine containing sulfur, an amine containing oxygen, an azole, benzimidazole, a bipyridine, furan, an imidazole, an imidazole-related species with at least one five-member ring, an indole, methylimidazole, an oxazole, phenanthroline, pterin, pteridine, a pyridine, a pyridine-related species with at least one six-member ring, pyrrole, quinoline, and a thiazole.

3. The method according to claim 1, wherein said electrolyte is at least one of Na2SO4, KHCO3, KCl, NaNO$_3$, NaCl, NaF, NaClO$_4$, KClO$_4$, K$_2$SiO$_3$, CaCl$_2$, a guanidinium cation, a H cation, an alkali metal cation, an ammonium cation, an alkylammonium cation, a halide ion, an alkyl amine, a borate, a carbonate, a guanidinium derivative, a nitrite, a nitrate, a phosphate, a polyphosphate, a perchlorate, a silicate, a sulfate, and a tetraalkyl ammonium salt.

4. The method according to claim 3, further comprising:
   introducing to said solution of said electrolyte at least one of a divalent cation including at least one of calcium, magnesium, or zinc.

5. The method according to claim 1, wherein said manner in which said carbon dioxide is bubbled comprises:
   bubbling said carbon dioxide to contact said cathode.

6. The method according to claim 1, wherein said manner in which said carbon dioxide is bubbled comprises:
   bubbling said carbon dioxide to avoid contact with said cathode.

7. The method according to claim 1, wherein said solution has a pH between approximately 1 and approximately 8.

8. The method according to claim 1, wherein said stainless steel includes at least one of SS 2205, SS 304, SS 316, and SS 321; and wherein said Sn alloy includes at least one of SnAg, SnPb, SnSb.

9. The method according to claim 1, wherein said cathode is selected from the group consisting of Sn, SnAg, SnPb, SnSb and mixtures thereof.

10. The method according to claim 1, wherein said catalyst includes quinoline.

11. The method according to claim 10, wherein the catalyst has a concentration of 10 to 100 mM.

12. The method according to claim 1, wherein the electrolyte includes KCl.

13. The method according to claim 12, wherein the electrolyte has a concentration of 0.25 to 1M.

14. The method according to claim 1, wherein the cathode has a potential of −1 to −1.4 volts vs SCE.

15. The method according to claim 1, wherein the solution has a pH of 5 to 7.

* * * * *